United States Patent
Adegawa

(10) Patent No.: US 7,144,970 B2
(45) Date of Patent: Dec. 5, 2006

(54) INSULATING-FILM FORMING MATERIAL AND INSULATING FILM USING THE SAME

(75) Inventor: Yutaka Adegawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 38 days.

(21) Appl. No.: 10/805,204

(22) Filed: Mar. 22, 2004

(65) Prior Publication Data

US 2004/0198922 A1 Oct. 7, 2004

(30) Foreign Application Priority Data

Mar. 28, 2003 (JP) .................. P. 2003-091226
Mar. 31, 2003 (JP) .................. P. 2003-095604
Mar. 18, 2004 (JP) .................. P. 2004-077740

(51) Int. Cl.
*C08G 79/02* (2006.01)

(52) U.S. Cl. .................. 528/169; 528/86; 528/125; 528/167; 528/403; 528/410; 525/390; 428/411.1

(58) Field of Classification Search ................ 528/169, 528/86, 125, 167, 403, 410; 525/390; 428/411.1
See application file for complete search history.

(56) References Cited

U.S. PATENT DOCUMENTS 5,658,994 A 8/1997 Burgoyne, Jr. et al.
6,124,421 A 9/2000 Lau et al.
6,303,733 B1 10/2001 Lau et al.
2003/0060591 A1 3/2003 Yoshida et al.

FOREIGN PATENT DOCUMENTS

EP 0 755957 A1 1/1997

*Primary Examiner*—Duc Truong
(74) *Attorney, Agent, or Firm*—Sughrue Mion, PLLC

(57) ABSTRACT

An insulating-film forming material comprising a resin (A) that has a structure represented by formula (I):

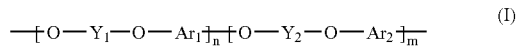

wherein $Y_1$, $Y_2$, $Ar_1$ and $Ar_2$ are the same or different; each of $Y_1$, $Y_2$, $Ar_1$ and $Ar_2$ represents an aromatic ring-containing divalent organic group; at least one of $Y_1$ and $Y_2$ is a divalent aromatic polycyclic group having a specific structure; m and n each indicates a molar percentage of the repeating units; and m falls between 0 and 100 with (m+n)=100.

10 Claims, No Drawings

INSULATING-FILM FORMING MATERIAL AND INSULATING FILM USING THE SAME

BACKGROUND OF THE INVENTION

1. Field of the Invention

The present invention relates to an insulating-film forming material, more precisely, to that capable of forming a coating film having a suitable uniform thickness, as an interlayer insulating-film material for semiconductor devices and others, and the film cracks little and has good dielectric characteristics. In particular, the insulating-film forming material of the invention is suitable for forming porous insulating films.

2. Description of the Related Art

Heretofore, silica ($SiO_2$) films formed in a vacuum process such as CVD are much used for interlayer insulating films in semiconductor devices and others. In recent years, insulating films that comprise, as the essential ingredient thereof, a hydrolyzed product of tetraalkoxysilane are formed in a coating process for more uniform interlayer insulating films, and they are referred to as SOG (spin on glass) films. With the increase in the degree of integration of semiconductor devices and others, organic SOG films have been developed for solving the problem of wiring delay. Comprising polyorganosiloxane as the essential ingredient thereof, the films serve as interlayer insulating films having a low dielectric constant.

CVD-$SiO_2$ films have a lowest dielectric constant of all inorganic material films, but their dielectric constant is about 4 or so. SiOF films have been investigated as CVD films having a low dielectric constant, and their dielectric constant is from about 3.3 to 3.5. However, the moisture absorption of the films is high, and the films are therefore problematic in that their dielectric constant may increase while they are used.

On the other hand, organic polymer films having a low dielectric constant of from 2.5 to 3.0 have a low glass transition temperature falling between 200 and 350° C. and have a large coefficient of thermal expansion, and are therefore problematic in that they may damage wiring. Organic SOG films are defective in that they may be readily oxidized and cracked in oxygen plasma ashing for resist peeling in multi-layered wiring pattern formation. Organic resins including organic SOG films are poorly adhesive to wiring materials, aluminium and aluminium-based alloys as well as copper and copper-based alloys, and are therefore problematic in that they may form voids around wires (concretely between wires and insulating material therearound). Water may penetrate into the voids to cause wire corrosion, and, in addition, the voids around wires may cause short circuits between wiring layers when via holes formed for multi-layered wiring are mispositioned, and, as a result, it lowers the reliability of the wired devices.

In that situation, known is an insulating-film forming, coating composition that contains a non-halogen polyarylene not having a site reactive with metal such as active fluoride, as an insulating-film material that has good insulating properties (see U.S. Pat. No. 5,658,994 and EP 755,957A1). However, since its Tg is not higher than 300° C. and is low, the material does not have an aptitude for process at 450° C. such as tungsten CVD. In addition, the material requires an adhesion promoter for ensuring its adhesiveness, and this further complicates the process with the material. U.S. Pat. No. 6,124,421 and U.S. Pat. No. 6,303,733B1 say that non-polymerizing non-halogen polyarylene ether and terminal-capped non-halogen polyarylene, ether may form insulating films having a low dielectric constant. In addition, JP-A 2003-41184 (corresponding to US 2003/0060591 A1) is known, which says that polyarylene ether prepared from biphenyl structure-having bisphenol or the like may form insulating films having a low dielectric constant.

SUMMARY OF THE INVENTION

However, with the increase in the degree of integration and with the increase in the number of multi-layers of semiconductor devices, better electric insulation between conductors is desired in the art, and, interlayer insulating-film materials having a lower dielectric constant and having better cracking resistance and heat resistance are therefore desired. The above-mentioned, insulating-film forming materials that contain a polyarylene ether-structured compound are desired to have better dielectric characteristics.

Accordingly, the present invention is to provide a film forming material that solves the problems noted above. More precisely, the invention is to provide a film forming material that may form a coating film having a suitable uniform thickness as an interlayer insulating film in semiconductor devices and others, and the film has good heat resistance and cracks little and has good dielectric characteristics.

We, the present inventors have found that the above-mentioned object of the invention can be attained by-the following constitution (1) to (9):

(1) An insulating-film forming material comprising a resin (A) that has a structure represented by general formula (I):

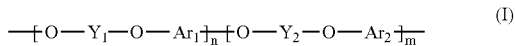

wherein $Y_1$, $Y_2$, $Ar_1$ and $Ar_2$ are the same or different; each of $Y_1$, $Y_2$, $Ar_1$ and $Ar_2$ represents an aromatic ring-containing divalent organic group; at least one of $Y_1$ and $Y_2$ is selected from the group consisting of formulae (Y-1), (Y-2), (Y-3) and (Y-4); m and n each indicates a molar percentage of the repeating units; and m falls between 0 and 100 with (m+n) =100,

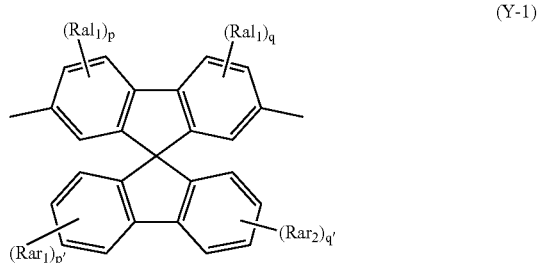

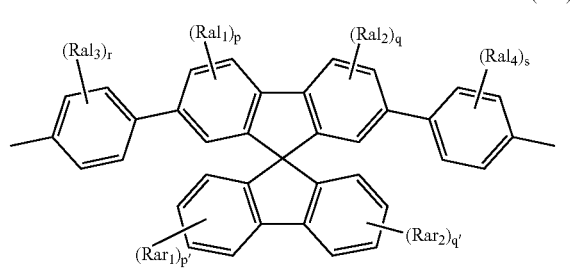

-continued (Y-3)
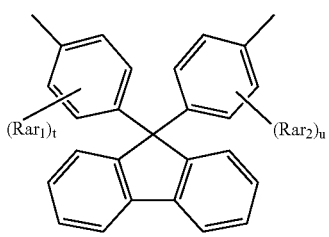

(Y-4)
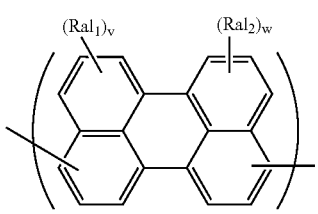

in formulae (Y-1) and (Y-2), $Ral_1$ to $Ral_4$ each represents a monovalent hydrocarbon group not containing an aromatic ring; $Rar_1$ and $Rar_2$ each represents an aromatic ring-containing monovalent hydrocarbon group; $Ral_1$ to $Ral_4$, $Rar_1$ and $Rar_2$ may bond to each other to form a ring; and p, q, r, s, p' and q' each indicates an integer of from 0 to 3; and in formulae (Y-3) and (Y-4), $Ral_1$ and $Ral_2$ each represents a monovalent hydrocarbon group not containing an aromatic ring; $Rar_1$ and $Rar_2$ each represents an aromatic ring-containing monovalent hydrocarbon group; $Ral_1$, $Ral_2$, $Rar_1$ and $Rar_2$ may bond to each other to form a ring; t and u each indicates an integer of from 1 to 4; and v and w each indicates an integer of from 0 to 4.

(2) The insulating-film forming material of above (1) wherein each of $Y_1$ and $Y_2$ in formula (I) is selected from the group consisting of formulae (Y-1) and (Y-2).

(3) The insulating-film forming material of above (1), wherein each of $Y_1$ and $Y_2$ in formula (I) is selected from the group consisting of formulae (Y-3) and (Y-4), and each of $Ar_1$ and $Ar_2$ is selected from the group consisting of the following groups [Ar]:

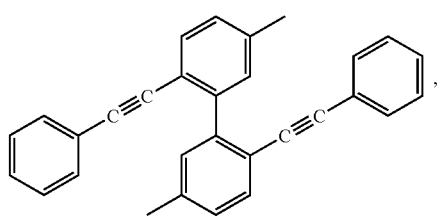,

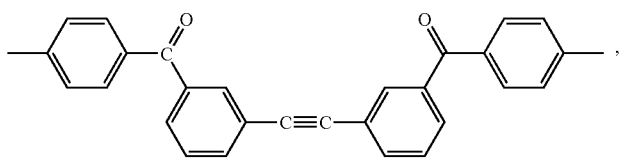,

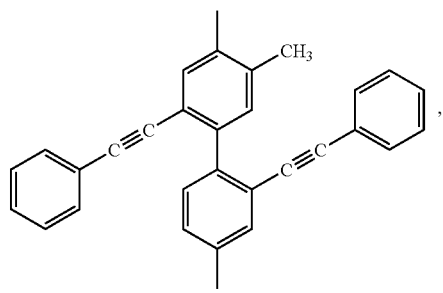,

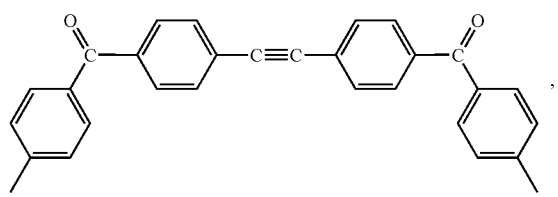,

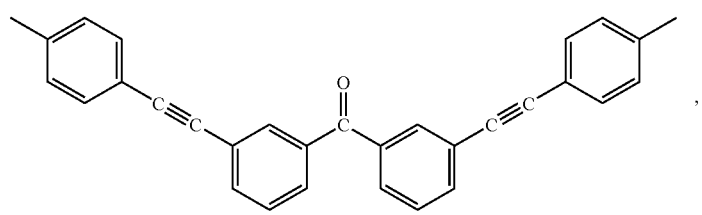,

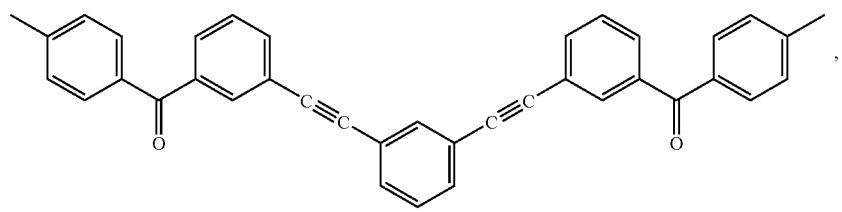,

-continued

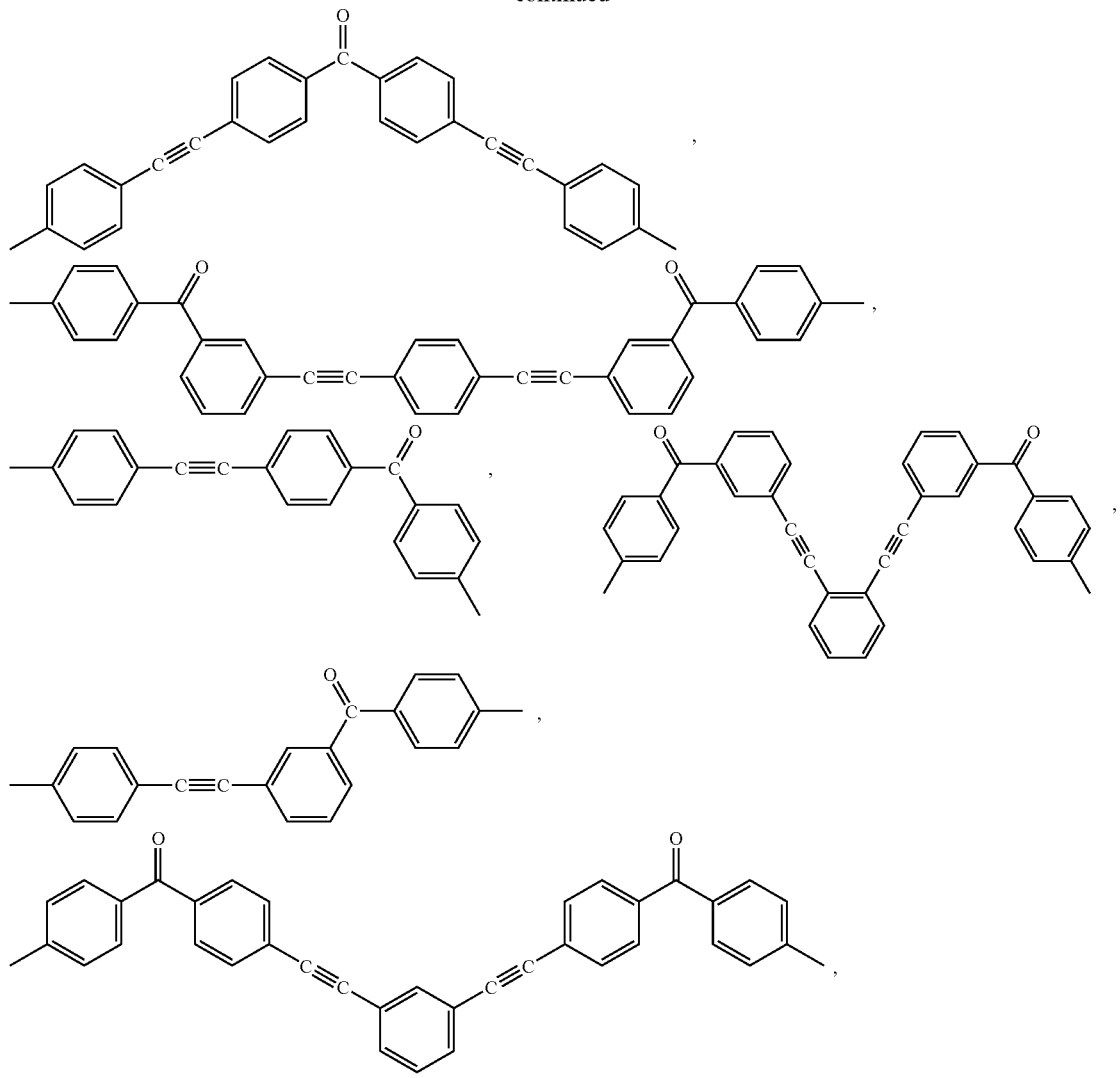

(4) An insulating film obtained by using an insulating-film forming material of any of above (1) to (3).

(5) A porous insulating-film forming material comprising: a polymer that has a structure represented by general formula (I); and at least one of a compound (B-1) and hollow particles (B-2), the compound (B-1) having a boiling or decomposition point of 250° C. to 450° C.,

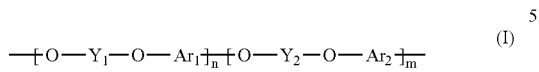

wherein $Y_1$, $Y_2$, $Ar_1$ and $Ar_2$ are the same or different; each of $Y_1$, $Y_2$, $Ar_1$ and $Ar_2$ represents an aromatic ring-containing divalent organic group; at least one of $Y_1$ and $Y_2$ is selected from the group consisting of formulae (Y-1), (Y-2), (Y-3) and (Y-4); m and n each indicates a molar percentage of the repeating units; and m falls between 0 and 100 with (m+n) =100;

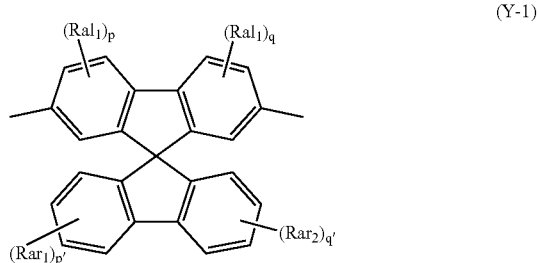

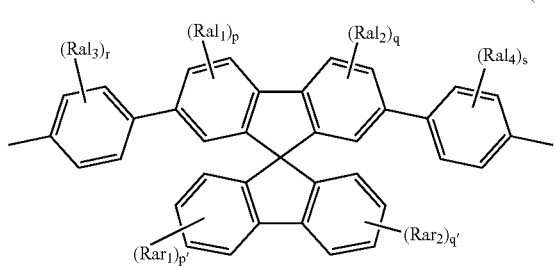

-continued

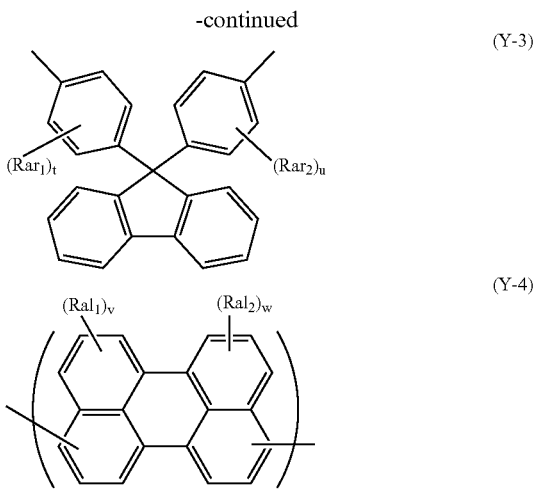

in formulae (Y-1) and (Y-2), $Ral_1$ to $Ral_4$ each represents a monovalent hydrocarbon group not containing an aromatic ring; $Rar_1$ and $Rar_2$ each represents an aromatic ring-containing monovalent hydrocarbon group; $Ral_1$ to $Ral_4$ $Rar_1$ and $Rar_2$ may bond to each other to form a ring; and p, q, r, s, p' and q' each indicates an integer of from 0 to 3; and in formulae (Y-3) and (Y-4), $Ral_1$ and $Ral_2$ each represents a monovalent hydrocarbon group not containing an aromatic ring; $Rar_1$ and $Rar_2$ each represents an aromatic ring-containing monovalent hydrocarbon group; $Ral_1$, $Ral_2$, $Rar_1$ and $Rar_2$ may bond to each other to form a ring; t and u each indicates an integer of from 1 to 4; and v and w each indicates an integer of from 0 to 4.

(6) The porous insulating-film forming material of above (5), wherein each of $Y_1$ and $Y_2$ in formula (I) is selected from the group consisting of formulae (Y-1) and (Y-2).

(7) The porous insulating-film forming material of above (5), wherein each of $Y_1$ and $Y_2$ in formula (I) is selected from the groups consisting of formulae (Y-3) and (Y-4).

(8) A porous insulating-film forming material comprising a resin (A') that has a structure represented by formula (I'):

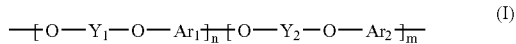

wherein $Y_1$, $Y_2$, $Ar_1$ and $Ar_2$ are the same or different;

each represents an aromatic ring-containing divalent organic group;

at least one of $Y_1$, $Y_2$, $Ar_1$ and $Ar_2$ includes at least one of (a) a structure that decomposes under heat at 250° C. to 450° C. to generate gas; (b) a structure that decomposes through UV irradiation to generate gas; and (c) a structure that decomposes through electron beam irradiation to generate gas;

m and n each indicates a molar percentage of the repeating units; and m falls between 0 and 100 with (m+n)=100.

(9) A porous insulating film obtained by using an insulating-film forming material of any of above (5) to (8).

DETAILED DESCRIPTION OF THE INVENTION

The insulating-film forming material of the invention is significantly characterized in that it contains a polyarylene ether having a specific structure of formula (I) or (I'), as so mentioned hereinabove. Specifically in the invention, $Y_1$ and $Y_2$, and $Ar_1$ and $Ar_2$ in formulae (I) and (I') each have a specific organic group, and the film formed of the material may therefore have a lowered dielectric constant. In particular, we, the present inventors have found that, since $Y_1$ and $Y_2$ do not contain a polar group such as hydroxyl group, the chemical stability of the resin is good, and therefore the dielectric constant of the film of the material is prevented from increasing with time. In addition, we have further found that, since the film forming material does not contain a fluorine atom, the film formed of it has further advantages in that its adhesiveness to the adjacent layers and to the substrate does not lower and it does not react with barrier metals to cause interlayer peeling.

When the film forming material that contains the polyarylene ether of the invention as a base polymer is applied to a substrate such as silicon wafer in a mode of dipping or spin coating, then it may well fill the grooves in fine patterns, and when it is heated to remove the organic solvent and to crosslink the polymer, then it forms a macro-polymer film. The resulting film may be a thick-filmy insulator that has good heat resistance and has a low dielectric constant.

The resin for use in the invention is described in detail hereinunder.

The resin having a structure of formula (I) or (I') is a polyarylene ether in which $Y_1$, $Y_2$, $Ar_1$ and $Ar_2$ have a specific organic group, as so mentioned hereinabove. Preferably, the resin having a structure of formula (I) or (I') for use in the invention has a weight-average molecular weight of from 1,000 to 10,000,000. Having a molecular weight that falls within the range, the polyarylene ether of the invention can be used in the insulating-film forming material irrespective of the level of the molecular weight thereof.

The first aspect of the invention is an insulating-film forming material that contains a resin (A) having a structure of formula (I).

The second aspect of the invention is a porous insulating-film forming material that contains a resin (A) having a structure of formula (I), and a compound (B-1) having a boiling point or a decomposition point that falls between 250° C. and 450° C.

The third aspect of the invention is a porous insulating-film forming material that contains a resin (A) having a structure of formula (I), and hollow particles (B-2).

The fourth aspect of the invention is a porous insulating-film forming material that contains a resin (A') having a structure of formula (I'), or that is a resin (A) in which at least one of $Y_1$, $Y_2$, $Ar_1$ and $Ar_2$ satisfies at least one of the following conditions (a) to (c):

(a) having a structure that decomposes under heat at 250° C. to 450° C. to generate gas, (b) having a structure that decomposes through UV irradiation to generate gas, (c) having a structure that decomposes through electron beam irradiation to generate gas.

The resin (A) for use in the first, second and third aspects of the invention is described below.

In formula (I), $Y_1$, $Y_2$, $Ar_1$ and $Ar_2$ may be the same or different, and each of $Y_1$, $Y_2$, $Ar_1$ and $Ar_2$ represents an aromatic ring-containing divalent organic group, and at least one of $Y_1$ and $Y_2$ is selected from the group consisting of formulae (Y-1) to (Y-4); and m and n each indicates a molar percentage of the repeating units, and m falls between 0 and 100 with (m+n)=100.

In formulae (Y-1) and (Y-2), $Ral_1$ to $Ral_4$ each represents a monovalent hydrocarbon group not containing an aromatic ring; $Rar_1$ and Rar2 each represents an aromatic ring-containing monovalent hydrocarbon group; $Ral_1$ to $Ral_4$, $Rar_1$ and $Rar_2$ may bond to each other to form a ring; p, q, r, s, p' and q' each indicates-an integer of from 0 to 3.

In formulae (Y-3) and (Y-4), $Ral_1$ and $Ral_2$ each represents a monovalent hydrocarbon group not containing an aromatic ring; $Rar_1$ and $Rar_2$ each represents an aromatic ring-containing monovalent hydrocarbon group; $Ral_1$, $Ral_2$, $Rar_1$ and $Rar_2$ may bond to each other to form a ring; t and u each indicates an integer of from 1 to 4; v and w each indicates an integer of from 0 to 4.

The monovalent hydrocarbon group not containing an aromatic ring includes the following (a-1) to (a-4). Preferably, they have at most 20 carbon atoms.

(a-1) Monovalent, linear, branched or cyclic, saturated hydrocarbon group (alkyl group),
(a-2) Ethylenic carbon-carbon double-bond having, monovalent, linear, branched or cyclic hydrocarbon group,
(a-3) Carbon-carbon tripe-bond having, monovalent, linear, branched or cyclic hydrocarbon group,
(a-4) Ethylenic carbon-carbon double-bond having and carbon-carbon tripe-bond having, monovalent, linear, branched or cyclic hydrocarbon group.

Examples of (a-1) to (a-4) are mentioned below.

(a-1) Linear, branched or cyclicalkyl group such as methyl, ethyl, n-propyl, isopropyl, cyclopropyl, n-butyl, isobutyl, t-butyl, n-pentyl, isopentyl, t-pentyl, neopentyl, cyclopentyl, n-hexyl, cyclohexyl, octyl, nonyl, dodecyl, hexadecyl, octadecyl; crosslinked cyclic hydrocarbon group (alicyclic group) such as 1-adamantyl; spiro-hydrocarbon group such as spirobicyclohexyl; preferably, methyl, ethyl, n-propyl, isopropyl, cyclopropyl, n-butyl isobutyl, t-butyl, (a-2) Linear, branched or cyclic alkenyl group such as vinyl, allyl, isopropenyl, 1-butenyl, 2-butenyl, 2-methylpropen-1-yl, 1-pentenyl, 2-pentenyl, 3-pentenyl, 2-methylbuten-1-yl; double-bond having cyclic terpene-type hydrocarbon group such as 5-norbornen-2-yl; preferably vinyl, allyl, isopropenyl, 1-butenyl, 2-butenyl, (a-3) Alkynyl group such as ethynyl, propargyl; alkanedienyl group such as 1,4-hexadienyl; alkanetrienyl group with three double bonds; alkanediynyl group with two triple bonds; alkanetriynyl group with three triple bonds; preferably, ethynyl, propargyl, (a-4) Enynyl group and others having both double bond and triple bond, such as 5-ethynyl-1,3,6-heptatrienyl.

The aromatic ring-containing monovalent hydrocarbon group includes the following (b-1) to (b-4).

(b-1) Group derived from the above (a-1) to (a-4), by substituting from 1 to 10 hydrogen atoms in the group with a monovalent aromatic hydrocarbon group,
(b-2) Group derived from the above (a-1) to (a-4) and (b-1), by substituting from 1 to 10 methylene groups therein with a divalent aromatic hydrocarbon group,
(b-3) Group derived from the above (a-1) to (a-4), (b-1) and (b-2), by substituting from 1 to 10 methylene groups therein with a trivalent aromatic hydrocarbon group,
(b-4) Group derived from the above (a-1) to (a-4) and (b-1) to (b-3), by substituting from 1 to 10 quaternary carbon atoms therein with a tetravalent aromatic hydrocarbon group.

In these, the number of the groups to be substituted is preferably from 1 to 8, more preferably from 1 to 4.

Aromatic hydrocarbon groups to be substituted in (b-1) to (b-4) include the following:

Aromatic hydrocarbon groups to be substituted in (b-1) include phenyl, naphthyl, anthryl, phenanthryl, pyrenyl and other monovalent aromatic hydrocarbon groups mentioned below. Phenyl and naphthyl are preferred.

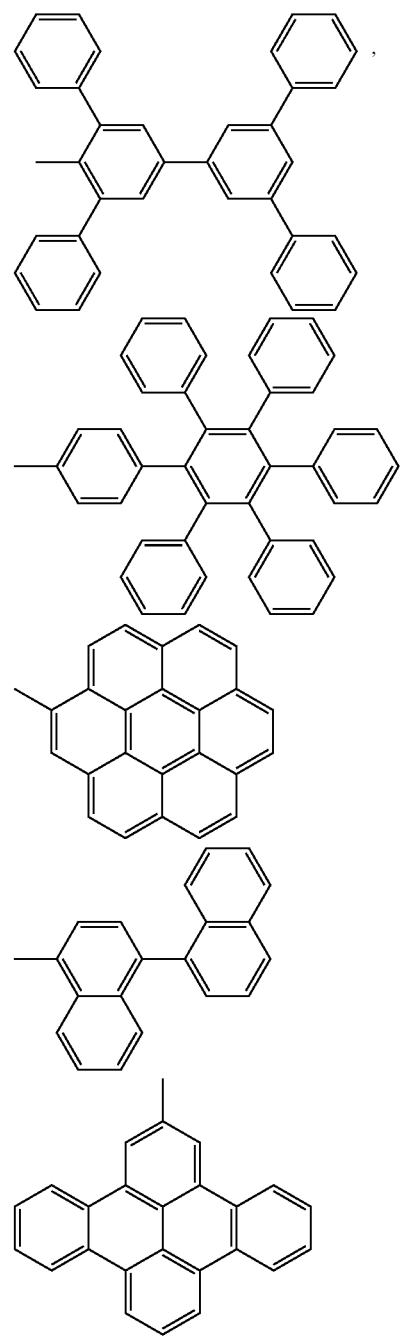

Aromatic hydrocarbon groups to be substituted in (b-2) include arylene groups such as 1,4-phenylene, 2,7-phenanthrene, 4,4'-bis(phenyl), and other divalent aromatic hydrocarbon groups mentioned below. Phenylene and naphthylene are preferred.

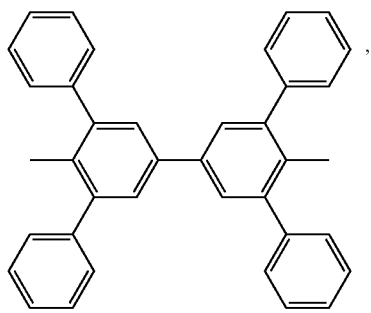

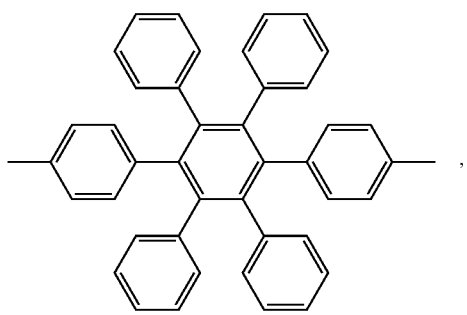

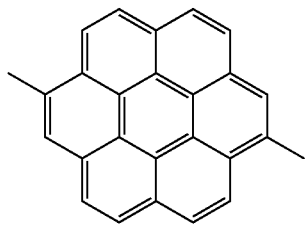

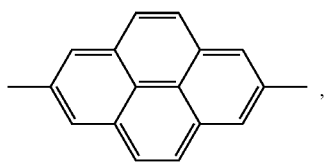

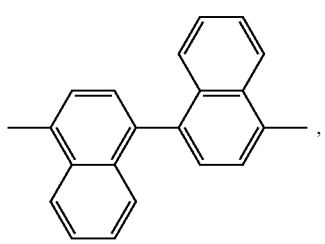

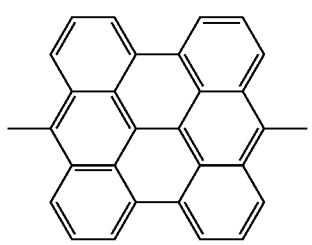

-continued

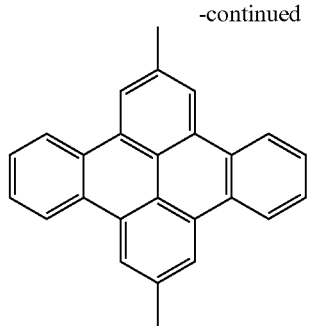

Aromatic hydrocarbon groups to be substituted in (b-3) include trivalent aromatic hydrocarbon groups such as 1,3,5-benzenetriyl, 1,2,6-naphthalenetriyl, 1,3,5-Benzenetriyl is preferred.

Aromatic hydrocarbon groups to be substituted in (b-4) include tetravalent aromatic hydrocarbon groups such as 1,2,4,5-benzenetetrayl, 1,4,5,8-anthracenetetrayl, 1,2,4,5-Benzenetetrayl is preferred.

One example of (b-2) that is derived from cyclic-hydrocarbon having (a-1), by substituting the carbon atoms in (a-1) with one aromatic hydrocarbon group and three divalent aromatic hydrocarbon groups is mentioned below.

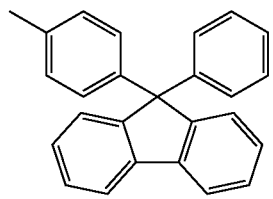

Examples of (b-3) that is derived from triple-bond having (a-3), by substituting the carbon atoms in (a-3) with two monovalent aromatic hydrocarbon groups, one divalent aromatic hydrocarbon groups and one trivalent aromatic hydrocarbon group are mentioned below. These are preferable, since they may form different hydrocarbon groups through chemical reaction.

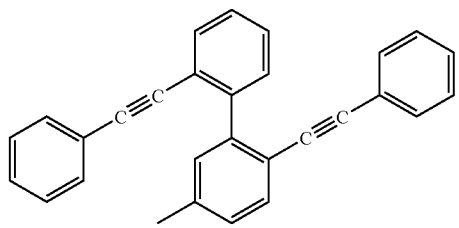

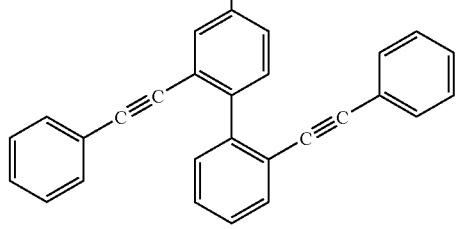

Of (b-2) or (b-3), those constructed by substituting methylene or methine in a cyclopropane structure with a divalent or trivalent benzene ring may have a benzocyclobutene structure. These hydrocarbon groups may form different hydrocarbon groups through chemical reaction, and are preferable in the invention. More concretely, examples of the structure are mentioned below.

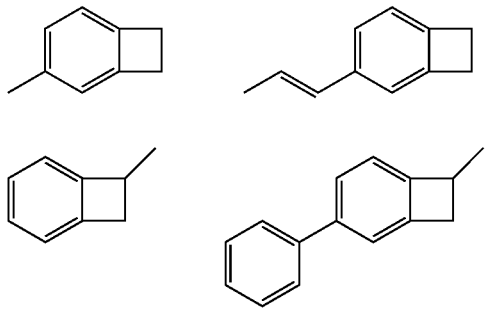

Preferred examples of formulae (Y-1) and (Y-2) are mentioned below, to which, however, the invention is not limited.

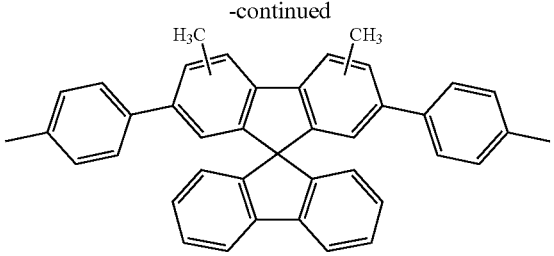

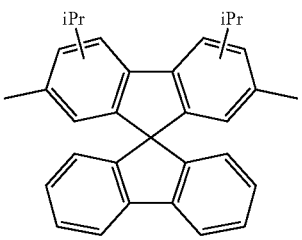

-continued

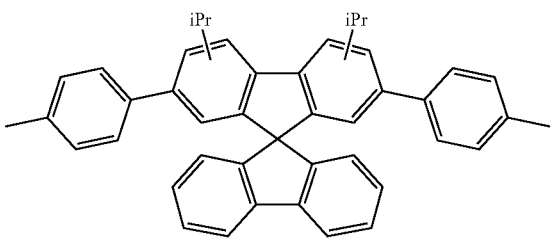

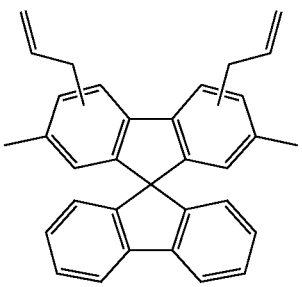

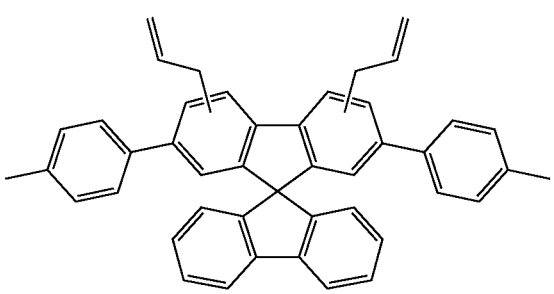

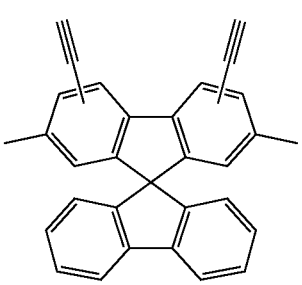

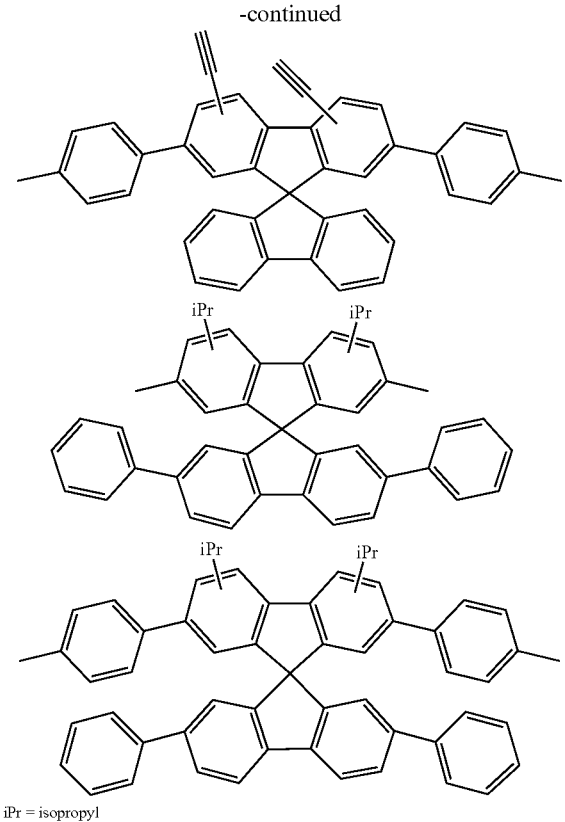
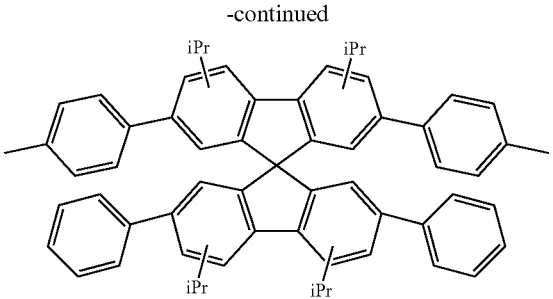
Preferred examples of (Y-3) and (Y-4) are mentioned below, to which, however, the invention is not limited.

-continued

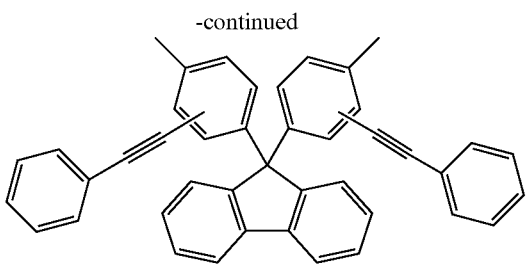

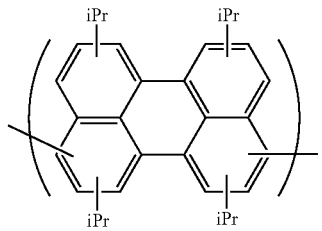

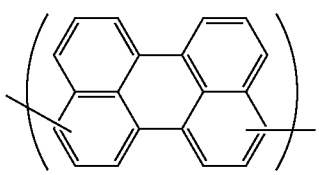

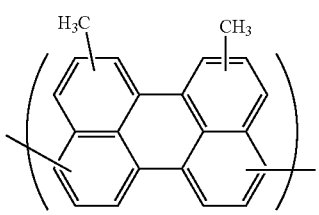

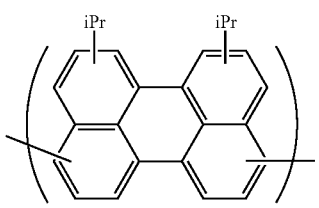

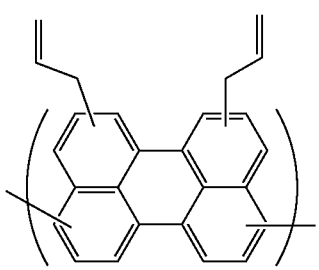

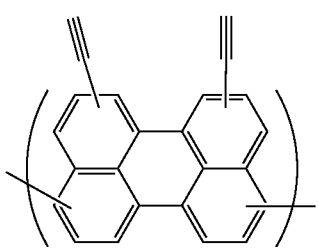

Ar$_1$ and Ar$_2$ in formula (I) are described below.

Ar$_1$ and Ar$_2$ may be the same or different, and each represents an aromatic ring-containing divalent organic group.

The aromatic ring-containing divalent organic group includes, for example, the specific skeleton-having divalent hydrocarbon groups referred to hereinabove for Y$_1$ and Y$_2$, as well as other divalent hydrocarbon groups capable of becoming different hydrocarbon groups through chemical reaction, divalent groups capable of becoming hydrocarbon groups through Diels-Alder reaction followed by subsequent elimination reaction, and aromatic ring-having and carbonyl group-having divalent groups.

The divalent hydrocarbon group capable of becoming a different hydrocarbon group through chemical reaction includes, for example, those having a benzocyclobutene structure. More concretely, its examples are mentioned below.

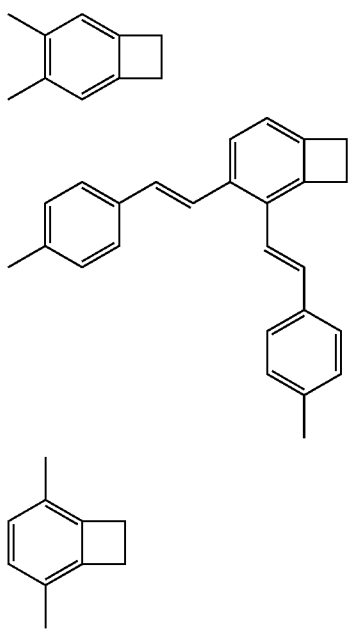

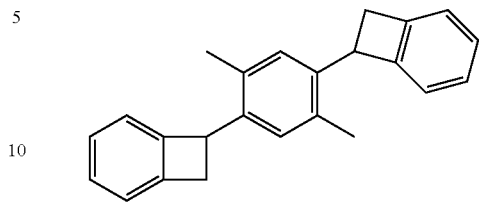

The group capable of becoming a hydrocarbon group through Diels-Alder reaction followed by subsequent elimination reaction is the following (c).

(c) Group having a hetero-atom having conjugated diene, or having conjugated, two aromatic weak double bonds. This reacts with a dienophile (diene-philic compound) such as substituted alkene or substituted alkyne in a mode of concerted addition [4+2], and then the hetero-atom having crosslinked site is eliminated from it to release a site to give a hydrocarbon group such as benzene ring.

Examples of the reaction mode of (c) are mentioned below.

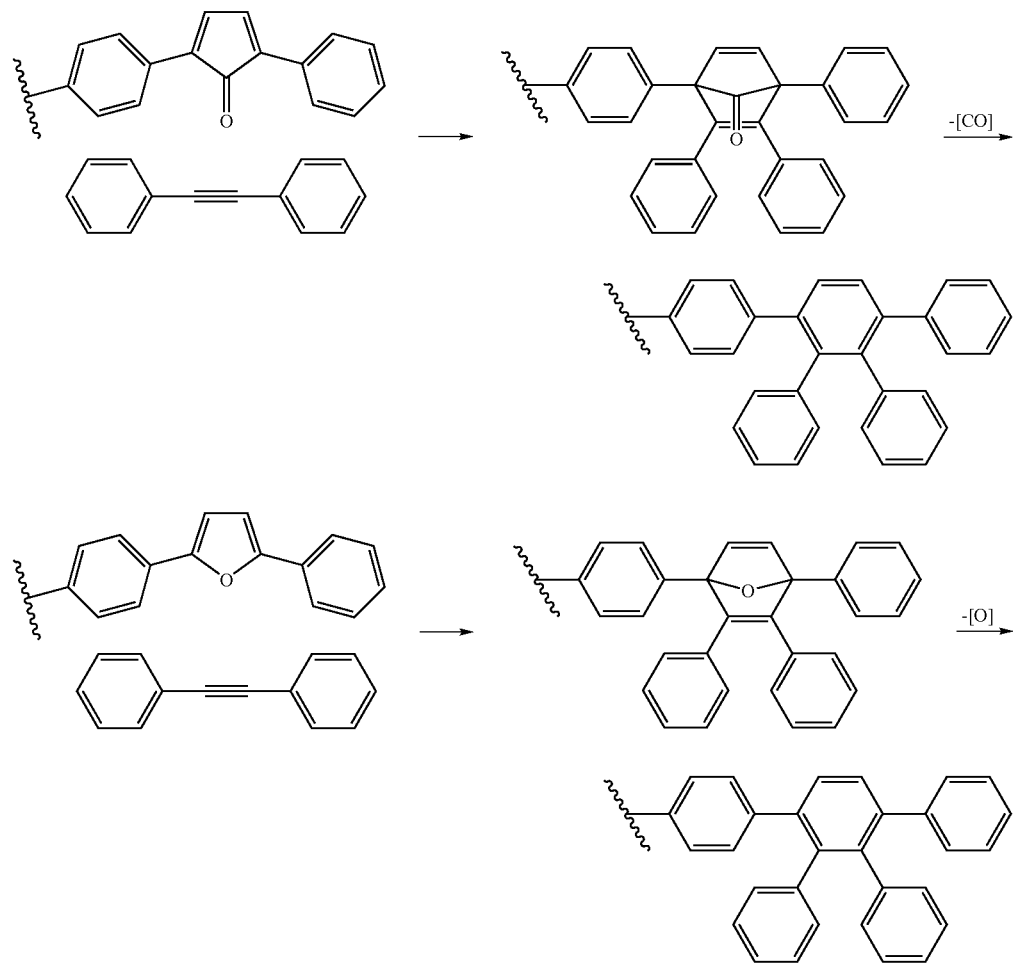

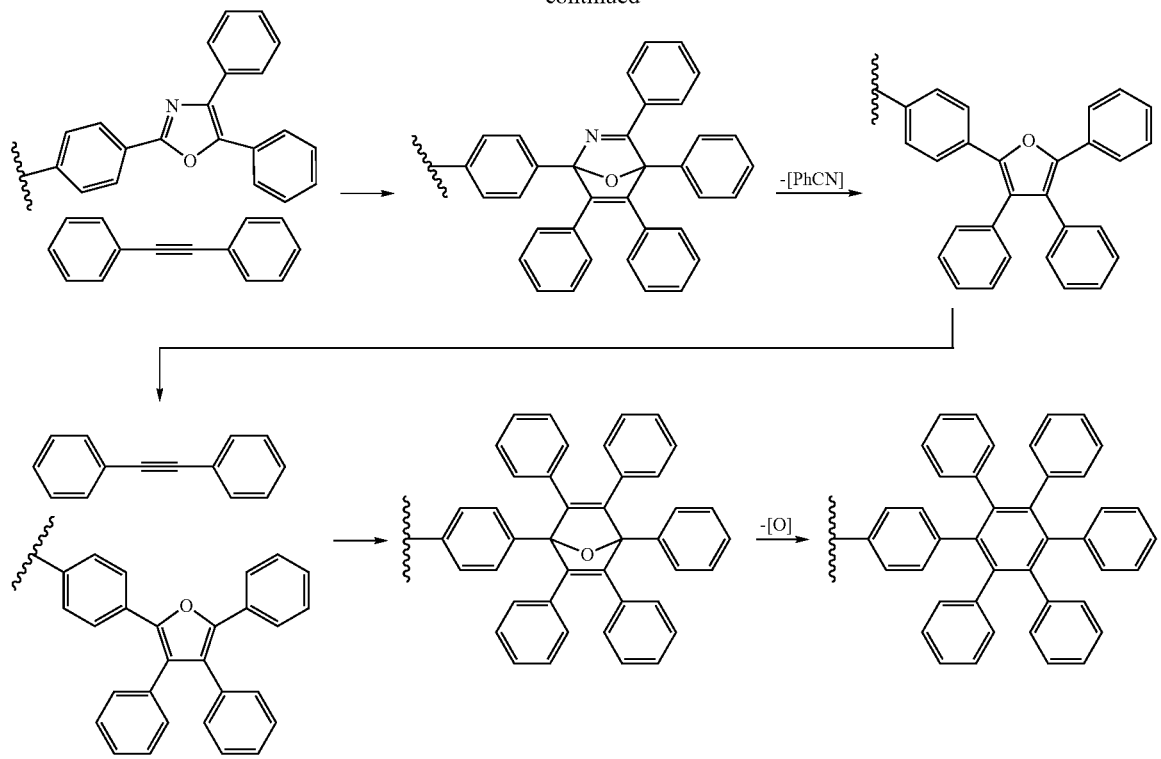

The divalent group (c) includes the following:
(c-1) Group derived from the above (b-1) to (b-4), by substituting from 1 to 3 aromatic rings in the group with a cyclopentadienone structure or an aromatic hydrocarbon-substituted cyclopentadienone structure having the same valence, and further substituting one hydrogen atom therein with a single bond,
(c-2) Group derived from the above (b-1) to (b-4), by substituting from 1 to 3 aromatic rings in the group with a furan structure or an aromatic hydrocarbon-substituted furan structure having the same valence, and further substituting one hydrogen atom therein with a single bond,
(c-3) Group derived from the above (b-1) to (b-4), by substituting from 1 to 3 aromatic rings in the group with an oxazole structure or an aromatic hydrocarbon-substituted oxazole structure having the same valence, and further substituting one hydrogen atom therein with a single bond.

More concrete examples of (c-1) to (c-3) are mentioned below.

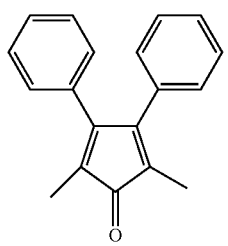

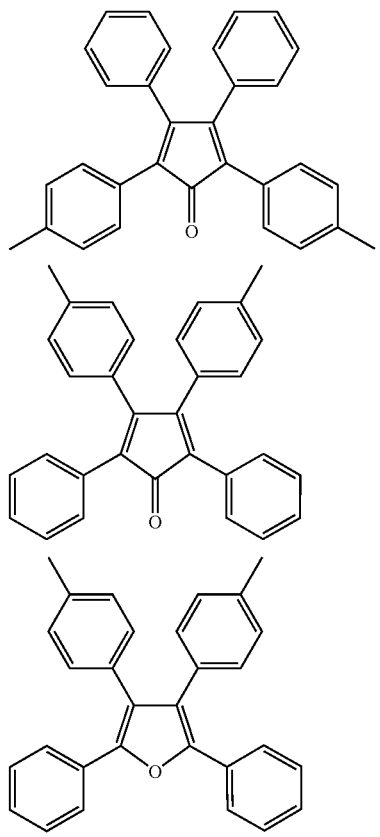

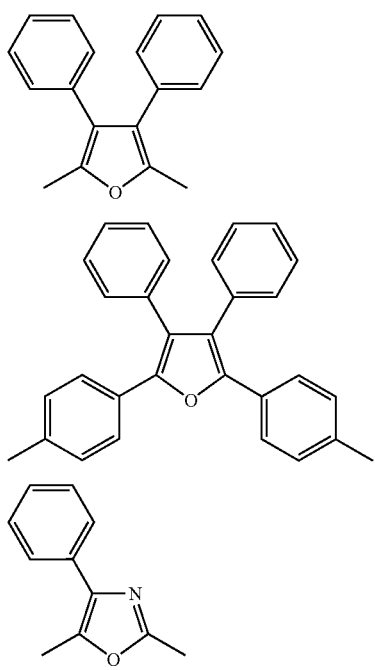

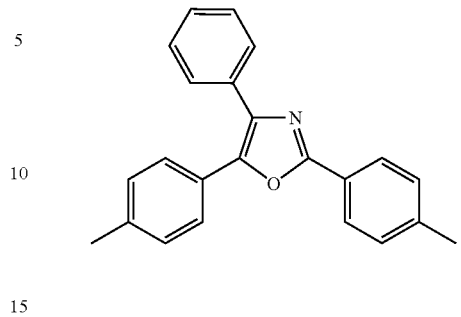

The aromatic ring-containing and carbonyl group-having divalent group is a group having both a carbonyl group and an aromatic ring in the molecule such as benzophenone structure.

For it, preferred are a group having both a benzene ring and a carbonyl group, and a group having both a naphthalene ring and a carbonyl group.

More concrete examples of the divalent groups are mentioned. When $Y_1$ and $Y_2$ are selected from (Y-3) and (Y-4), $Ar_1$ and $Ar_2$ are preferably selected from the following groups {Ar}:

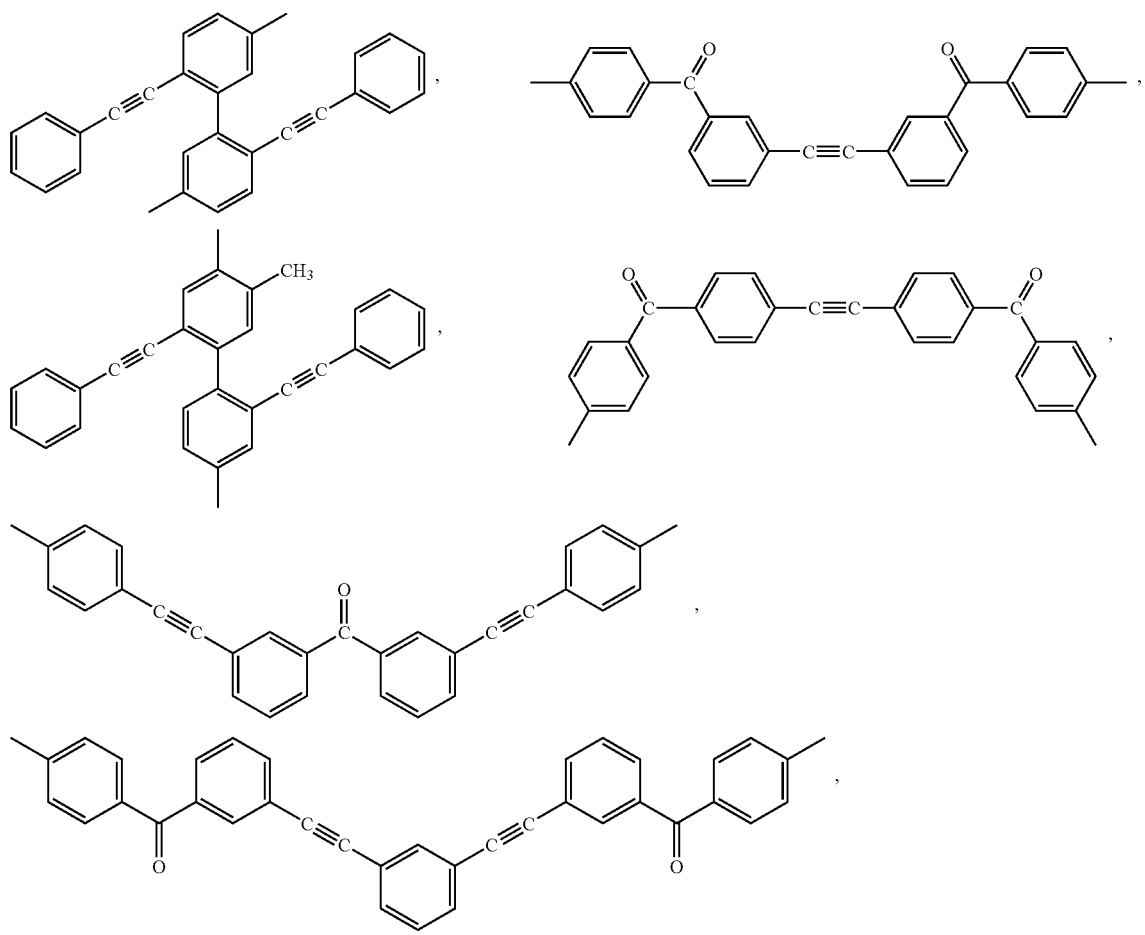

-continued

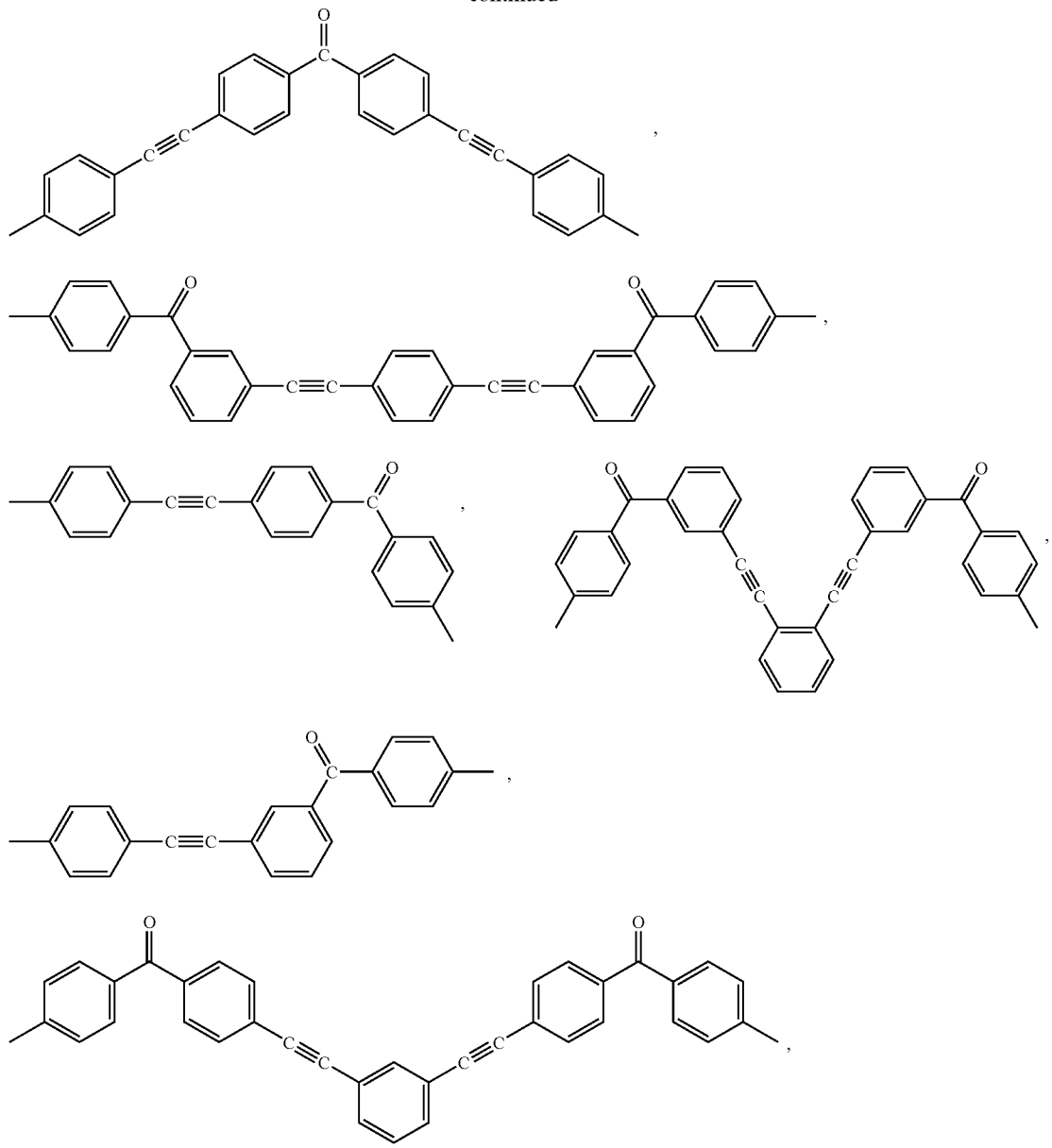

The aromatic ring-containing divalent organic group also includes an aromatic ring-containing and silicon atom-containing divalent organic group. In the aromatic ring-containing and silicon atom-containing divalent organic group, a silicon-containing organic group is a group derived from a hydrocarbon group, a group capable of becoming a hydrocarbon group through Diels-Alder reaction followed by subsequent elimination reaction, a group having an aromatic ring and a carbonyl group or the like, by substituting a part of the carbon atoms in the group with a silicon atom. It includes, for example, those derived from the preferred groups mentioned above by substituting from 1 to 8 hydrogen atoms with a silicon atom. In these, the number of substituted silicon atoms is preferably from 1 to 4. The groups have at least one carbon atom.

In formula (I), when $Y_1$ and $Y_2$ are selected from (Y-1) and (Y-2), it is more desirable that the formula (I) satisfies at least one of the following conditions (i) to (iii):

(i) having at least one carbon-carbon triple bond,
(ii) having at least one carbon-carbon double bond or carbon-nitrogen double bond that conjugates with an aromatic group,
(iii) having at least one aromatic ring with at least 10 carbon atoms.

For the condition (i), it is desirable that the resin has from 1 to 8 triple bonds per one repeating unit, more preferably from 1 to 4 triplebonds. For the condition (ii), it is desirable that the resin has from 1 to 16 carbon-carbon double bonds or carbon-nitrogen double bonds each conjugating with an aromatic group, per one repeating unit, more preferably from 1 to 4 such double bonds. For the condition (iii), it is desirable that the resin has from 1 to 8 aromatic rings with at least 10 carbon atoms per one repeating unit, more preferably 1 or 2 such aromatic rings.

Of those conditions, more preferred are (i) and/or (ii).

In formula (I), m and n each indicates a molar percentage of the repeating units, and m falls between 0 and 100 with (m+n)=100. Preferably, n falls between 50 and 100.

More preferably, at least one of $Y_1$, $Y_2$, $Ar_1$ and $Ar_2$ in formula (I) satisfies at least one of the following conditions (i) to (iii):
(i) having at least one carbon-carbon triple bond,
(ii) having at least one carbon-carbon double bond or carbon-nitrogen double-bond that conjugates with an aromatic group,
(iii) having at least one aromatic ring with at least 10 carbon atoms.

For the condition (i), it is desirable that the resin has from 1 to 8 triple bonds per one repeating unit, more preferably from 1 to 4 triple bonds. For the condition (ii), it is desirable that the resin has from 1 to 16 carbon-carbon double bonds or carbon-nitrogen double bonds each conjugating with an aromatic group, per one repeating unit, more preferably from 1 to 4 such double bonds. For the condition (iii), it is desirable that the resin has from 1 to 8 aromatic rings with at least 10 carbon atoms per one repeating unit, more preferably 1 or 2 such aromatic rings of those conditions, more preferred are (i) and/or (ii).

In the invention, the resin for the component (A) may be used either singly or as a mixture of two or more different resins. The amount of the resin for the component (A) to be used may be from 40 to 100% by mass, preferably from 60 to 100% by mass, based on the total weight (exclusive of solvent) of the insulating-film forming material.

Specific examples of the structure of formula (I), which the resin for the component (A) in the invention has, are mentioned below, to which, however, the invention should not be limited. The concrete structures shown herein may be synthesized in the same manner as that mentioned hereinunder optionally followed by functional group conversion.

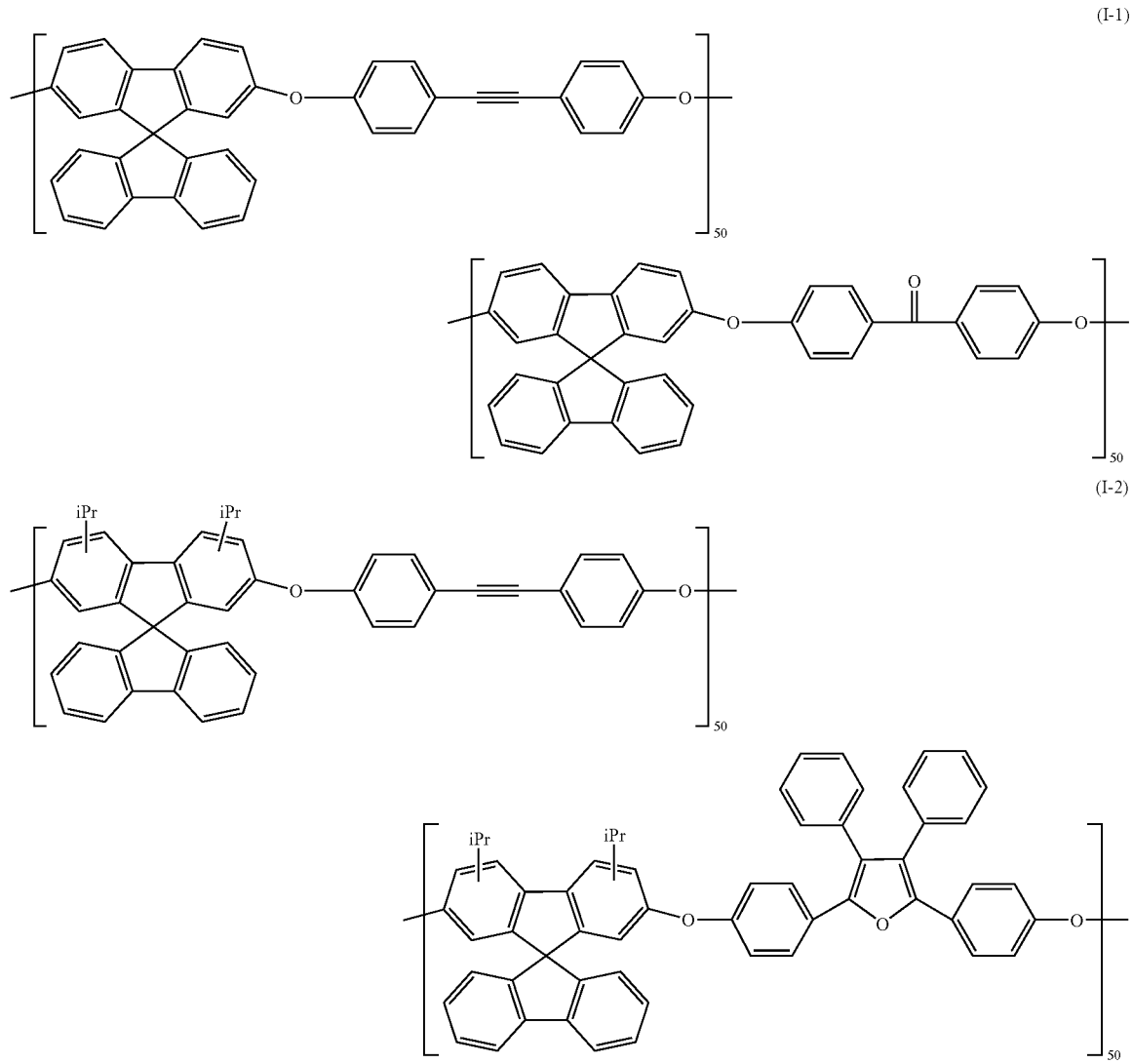

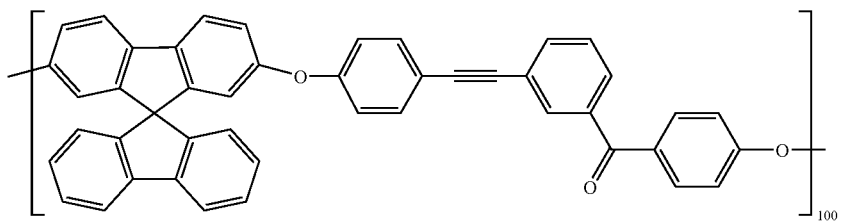
(I-3)

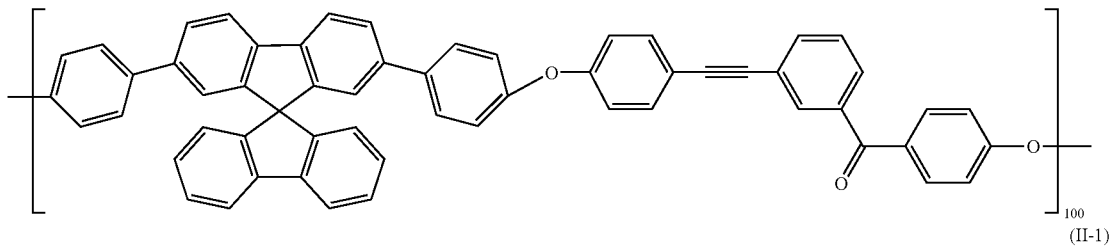
(I-4)

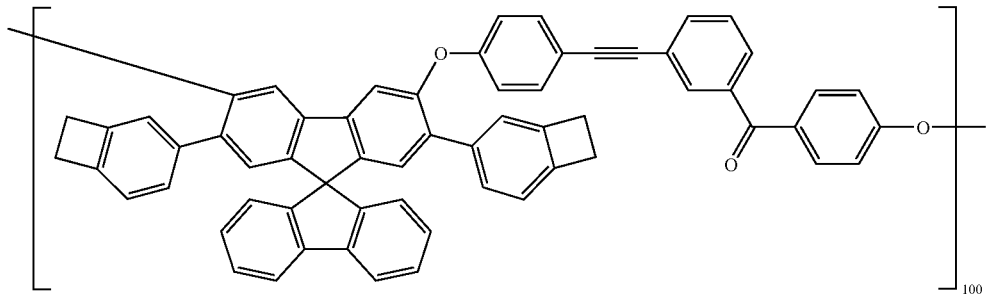
(II-1)

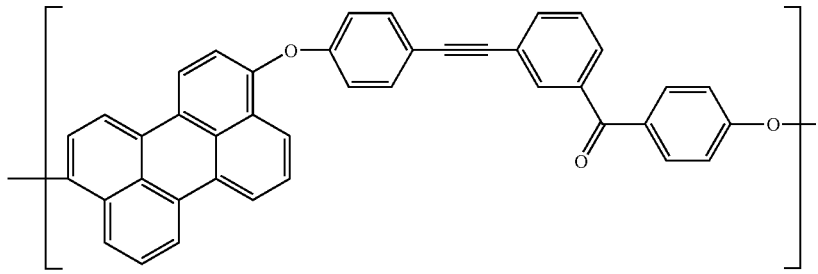
(II-2)

In the above formulae, the polymer terminal is a hydrogen atom or the following structure.

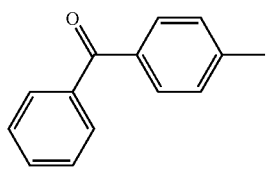

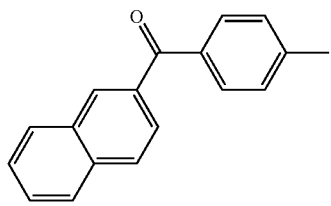

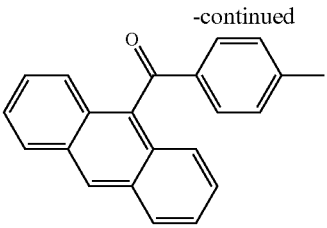

In the invention, the resin for the component (A) may be combined with any other resin. The additional resin includes, for example, basket-structured polysilsesquioxane resins, ladder-structured polysilsesquioxane resins, hydrolyzates and/or condensates of alkoxysilanes, and hydrocarbon polymers.

The resin of formula (I) for use in the invention may be produced through condensation of a diphenol-structured compound and an aromatic bisfluoro-structured compound in the presence of a basic catalyst in accordance with the intended product. For example, it may be produced according to the methods described in *Macromolecules*, 1993, 26, 1777–1778 (1993). In addition, known coupling reactions (e.g., Wittig reaction, Diels-Alder reaction, McMurray coupling, Heck reaction, Still coupling, Suzuki coupling, Castro acetylene coupling, Negishi coupling, Sono et al's acetylene coupling) are also preferably employed.

For example, the resin may be produced as follows:

[Preparation of Insulating-film Forming Material with Resin of Formula (I)]

The insulating-film forming material of the invention is prepared by dissolving the above-mentioned components in a solvent, and applied onto a support. In preparing the insulating-film forming material of the invention, the resin having a structure of formula (I) of the invention and optionally any other components are mixed, and the method for the preparation is not specifically defined.

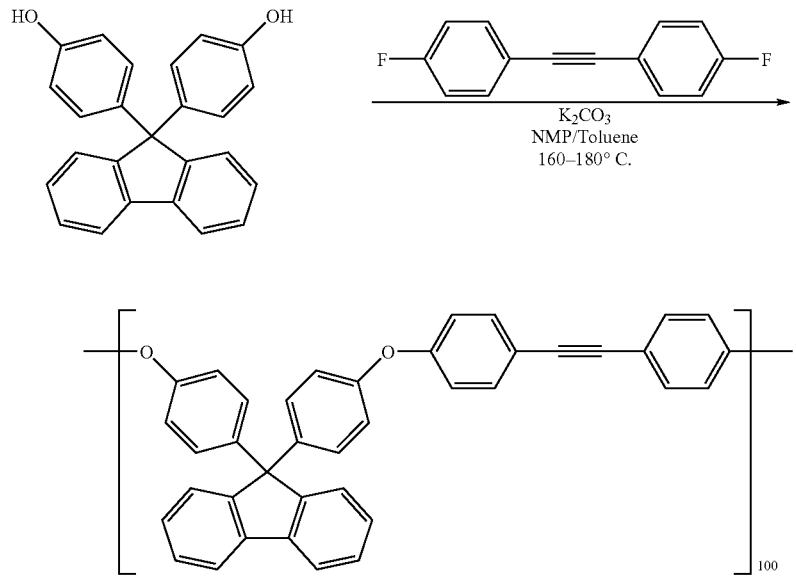

After the polymer structure has been formed, the substituent therein may be substituted with any desired functional group. For the reaction for substitution, known coupling reactions are preferred.

[Other Additives]

The insulating-film forming material of the invention may contain any-other component such as colloidal silica, colloidal alumina, organic polymer, surfactant. The colloidal silica is, for example, a dispersion prepared by dispersing high-purity silicic anhydride in a hydrophilic organic solvent such as that mentioned above. In general, it has a mean particle size of from 5 to 30 mµ, preferably from 10 to 20 mµ, and has a solid content of from 10 to 40% by weight or so. The colloidal silica of the type includes, for example, Nissan Chemical's methanol silica sol and isopropanol silica sol; and Shokubai Kasei's Oscal. The colloidal alumina includes, for example, Nissan Chemical's Alumina Sol 520, 100, 200; and Kawaken Fine Chemical's Alumina Clearsol, Alumina Sol 10, 132. The organic polymer includes, for example, polyalkylene oxide structure-having compounds, sugar chain structure-having compounds, vinylamide polymers, (meth)acrylate compounds, aromatic vinyl compounds, dendrimers, polyimides, polyamic acids, polyarylenes, polyamides, polyquinoxalines, polyoxadiazoles, fluoropolymers. The surfactant includes, for example, nonionic surfactants, anionic surfactants, cationic surfactants, ampholytic surfactants, as well as silicone surfactants, polyalkylene oxide surfactants, and fluorine-containing surfactants.

Preferred examples of the solvent are ethylene dichloride, cyclohexanone, cyclopentanone, 2-heptanone, methyl isobutyl ketone, γ-butyrolactone, methyl ethyl ketone, methanol, ethanol, dimethylimidazolidinone, ethylene glycol monomethyl ether, ethylene glycolmonoethyl ether, ethylene glycol dimethyl ether, 2-methoxyethyl acetate, ethylene glycol monoethyl ether acetate, propylene glycol monomethyl ether (PGME), propylene glycol monomethyl ether acetate (PGMEA), tetraethylene glycol dimethyl ether, triethylene glycol monobutyl ether, triethylene glycol monomethyl ether, isopropanol, ethylene carbonate, ethyl acetate, butyl acetate, methyl acetate, ethyl acetate, methyl methoxypropionate, ethyl ethoxypropionate, methyl pyruvate, ethyl pyruvate, propyl pyruvate, N,N-dimethylformamide, dimethylacetamide, dimethylsulfoxide, N-methylpyrrolidone, tetrahydrofuran, diisopropylbenzene, toluene, xylene, mesitylene. One or more of these solvents may be used herein either singly or as combined.

Of the above, more preferred are propylene glycol monomethyl ether acetate, propylene glycol monomethyl ether, 2-heptanone, cyclohexanone, γ-butyrolactone, ethylene glycol monomethyl ether, ethylene glycol monoethyl.ether, ethylene glycol monoethyl ether acetate, propylene glycol monomethyl ether, propylene glycol monoethyl ether, ethylene carbonate, butyl acetate, methyl lactate, ethyl lactate, methyl methoxypropionate, ethyl ethoxypropionate, N-methylpyrrolidone, N,N-dimethylformamide, tetrahydrofuran, methyl isobutyl ketone, xylene, mesitylene, diisopropylbenzene.

The overall solid content of the film forming material of the invention, thus prepared, is preferably from 2 to 30% by mass, and it may be suitably controlled in accordance with the use of the material. When the overall solid content of the film forming material is from 2 to 30% by mass, then the thickness of the film formed of the material may fall within a suitable range and the storage stability of the material is better. The number-average molecular weight of the resin having a structure of formula (I) generally falls between 1,000 and 10,000,000, but preferably between 1,000 and 100,000 or so, more preferably between 2,000 and 20,000 or so.

When the insulating-film forming material of the invention, thus prepared, is applied to a substrate such as silicon wafer, $SiO_2$ wafer or SiN wafer, a coating method of spin-coating, dipping, roll-coating or spraying may be employed.

The dry thickness of the film thus formed of the material may be from 0.05 to 1.5 μm or so in single coating, and from 0.1 to 3 μm or so in double coating. After thus formed, the film may be dried at room temperature or under heat at 80 to 600° C. or so generally for 5 to 240 minutes or so, and it forms a macro-polymer film that serves as an insulating film. For heating the film, for example, employable is any of hot plates, ovens or furnaces. The heating atmosphere may be air, nitrogen or argon, or may be in vacuum or under reduced pressure with controlled oxygen concentration.

More concretely, the insulating-film forming material of the invention is applied onto a substrate (generally metal-wired thereon) in a mode of spin coating, then subjected to first heat treatment at 300° C. or lower for solvent removal and partial crosslinking, and then subjected to second heat treatment (annealing) at a temperature higher than 300° C. but not higher than 450° C. to form an insulating film having a low dielectric constant. The first heat treatment is effected at 300° C. or lower. This is for readily controlling the degree of crosslinking so that the film is not too much crosslinked. The second heat treatment is effected at a temperature higher than 300° C. but not higher than 450° C. This is because the temperature falling within the range is generally good for annealing.

The first heat treatment may be effected even in air. For controlling the dielectric constant of the insulating film formed, the degree of crosslinking of the film may be controlled. Controlling the degree of crosslinking may be attained by controlling the temperature and the time for the heat treatment.

In the second and third-aspects of the invention, the porosity of the insulating film being formed may be controlled so as to make the film porous, and the resulting porous, insulating film may have a lower dielectric constant of at most 2.5, preferably at most 2.0. For making the film porous, employable are (1) a method of mixing the polymer material with a pyrolyzing or vapor reactive substance, and removing the reactive substance after the polymer has cured to thereby obtain a porous material (pyrogel) (second aspect), and (2) a method of mixing the polymer material with hollow particles to form a gel skeleton in wet, and removing the liquid phase such as solvent on the condition that the gel skeleton is not broken to thereby obtain a porous material (xerogel) (third aspect).

More concretely in the second aspect, for example, the compound (B-1) capable of dissolving or dispersing in the insulating-film forming material and having a boiling point or decomposition point falling between 250° C. and 450° C. is added to the material, then the resulting material is applied onto a substrate and heated at a temperature lower than the boiling point or the decomposition point of the compound to there by partly cure the resin (A) having a structure of formula (I), and then this is further heated at a temperature not lower than the boiling point or the decomposition point of the compound (B-1) to thereby cure the resin, or that is, the resin is cured along with gas generation under heat for boiling or decomposition, and the film thus formed is therefore made porous (for example, refer to JP-A 11-323256, JP-A 2001-110601, JP-A 2001-2992, JP-A 10-283843).

The compound (B-1) includes, for example, (a) polyalkylene oxide structure-having compounds, (b) sugar chain structure-having compounds, (c) vinylamide polymers, (d) (meth)acrylate polymers, (e) aromatic vinyl polymers, (f) dendrimers, (g) oleophilic compounds and dispersants, and (h) organic ultrafine particles. In the invention, the boiling point and the decomposition point are under atmospheric pressure.

(a) Polyalkylene Oxide Structure-having Compounds:

The polyalkylene oxide structure includes, for example, polyethylene oxide structure, polypropylene oxide structure, polytetramethylene oxide structure, polybutylene oxide structure. Concretely, the compounds include ether-structured compounds such aspolyoxyethylene alkyl ethers, polyoxyethylene alkyl phenyl ethers, polyoxyethylene sterol ethers, polyoxyethylene lanolin derivatives, ethylene oxide derivatives of alkylphenol-formalin condensates, polyoxyethylene-polyoxypropylene block copolymers, polyoxyethylene-polyoxypropylene alkyl ethers; ether-ester-structured compounds such as polyoxyethylene glycerin fatty acid esters, polyoxyethylene sorbitan fatty acid esters, polyoxyethylene sorbitol fatty acid esters, polyoxyethylene fatty acid alkanolamide sulfates; other ether-ester structured compounds such as-polyethylene glycol fatty acid esters, ethylene glycol fatty acid esters, fatty-acid monoglycerides, polyglycerin fatty acid esters, sorbitan fatty acid esters, propylene glycol fatty acid esters, sucrose fatty acid esters.

(b) Sugar Chain Structure-having Compounds:

The sugar chain structure-having compounds include, for example, cyclodextrin, starch, sucrose esters, oligosaccharides, glucose, fructose, mannitol, starch sugar, D-sorbitol, dextran, xanthane gum, curdlane, pullulane, cycloamylose, isomerized sugar, maltitol, cellulose acetate, cellulose, carboxymethyl cellulose, hydroxyethyl cellulose, hydroxypropyl cellulose, methyl cellulose, carboxymethyl cellulose, chitin, chitosan.

Preferably, the sugar chain structure-having compounds for use in the invention are modified partly or completely at the hydroxyl group or the amino group thereof. The chemical modification of hydroxyl group includes, for example, etherification, esterification, trialkylsilyl bond introduction, and urethane bond introduction. The chemical modification of amino group includes, for example, amido bond introduction, urea bond introduction, and imido bond introduction. For the sugar chain structure-having compound, preferred is cyclodextrin as it forms small and readily-controllable pores after decomposition. For the chemical modification, preferred is trialkylsilyl modification and urethanation, and more preferred is trimethylsilyl modification. In order to modify the sugar chain structure-having compound with a trimethylsilyl group, the compound may be reacted with a trimethylsilylating agent such as trimethylchlorosilane or trimethylchlorosilylacetamide. In general, from 5 to 100% of the hydroxyl group of the sugar chain structure-having compound may be substituted for the modification. In order to modify the sugar chain structure-having compound with a trimethylsilyl group, the compound may be reacted with trimethylchlorosilane. In general, from 5 to 100% of the hydroxyl group of the sugar chain structure-having compound may be substituted for the modification. In order to introduce an urethane bond into the sugar chain structure-having compound, the compound may be reacted with an urethanating agent such as phenyl isocyanate or hexyl isocyanate. In general, from 5 to 100% of the hydroxyl group of cyclodextrin may be modified to that effect.

(c) Vinylainide Polymers:

The vinylamide polymers include, for example, poly(N-vinylacetamide), poly(N-vinylpyrrolidone), poly(2-methyl-2-oxazoline), poly(N,N-dimethylacrylamide).

(d) (Meth)acrylate Polymers:

The (meth)acrylate polymers are polymers of radical-polymerizing monomer that comprises, as the essential ingredient thereof, (meth)acrylate such as methyl (meth) acrylate, ethyl (meth)acrylate, butyl (meth)acrylate, benzyl (meth)acrylate, tetrahydrofurfuryl (meth)acrylate, glycidyl (meth)acrylate, hydroxyethyl (meth)acrylate, (meth)acrylamidohydroxypropyl (meth)acrylate.

(e) Aromatic Vinyl Polymers:

The aromatic vinyl polymers include, for example, polystyrene, polymethylstyrene, poly-α-methylstyrene.

(f) Dendrimers:

The dendrimers include, for example, benzyl ether dendrimers, phenylacetylene dendrimers, polyamine dendrimers, polyamide dendrimers. In view of their pyrolyzability, polyamine dendrimers are preferred.

(g) Oleophilic Compounds and Dispersants:

For producing porous films, an oleophilic compound and a dispersant may be added to the film-forming material. The oleophilic compound includes, for example, polycarboxylates such as didecyl phthalate, diundecyl phthalate, didodecyl phthalate, ditridecyl phthalate, tris(2-ethylhexyl) trimellitate, tridecyl trimellitate, tridodecyl trimellitate, tetrabutyl pyromellitate, tetrahexyl trimellitate, tetraoctyl pyromellitate, bis(2-ethylhexyl) dodecanedioate, bisdecyl dodecanedioate. The dispersant that makes the oleophilic compound miscible with the polymer is, for example, a higher alcohol such as octanol, lauryl alcohol, decyl alcohol, undecyl alcohol. The amount of the higher alcohol to be used for the dispersant may be from 0.1 to 10 times (by mass) of the oleophilic compound.

(h) Organic Ultrafine Particles:

The organic ultrafine particles are polymer particles having a particle size of at most 100 nm, and they may be prepared through ordinary emulsion polymerization under specific control of the type of the emulsifier to be used, the concentration of the emulsifier and the stirring speed. Briefly, they may be prepared from monomers of aromatic vinyl compounds or (meth)acrylate compounds, combined with crosslinking monomers for particle size control.

In the third aspect of the invention, employed is a method of adding hollow particles (B-2) to the film forming material (e.g., refer to JP-A 11-217458). In this case, the wet gel film formed is dried with no shrinkage of the film. As the case may be, the method may be combined with a method of using a surfactant as a matrix to form a silica film of high regularity or with a supercritical drying aerosol method.

Hollow polymer particles (polymer particles each having a single enclosed void therein) serving as hollow particles have been widely used in the fields of paper, fabrics or leather coating, paint industry, etc., as, for example, organic-based micro-capsule particles in which various materials are filled in the void, or as an organic-based light scattering agent or an organic-based light scattering aid, etc. whereby the light scattering capability caused by making the particles hollow is utilized. The method of producing such hollow polymer particles includes, for example, the one disclosed in Japanese Patent Publications 7688/1991 and 9124/1991, etc., wherein a core formed by emulsion polymerization of a monomer system containing at least one carboxylic acid group and a shell formed by polymerizing a different monomer system (in which at least one monomer is of hard nature, having a Tg exceeding 25° C., not provided with film-forming capability at 20° C., and capable of giving rise to a polymer that permits ammonia and amines to penetrate therethrough) are prepared, and wherein the core is swollen by neutralization with ammonia or an amine followed by drying to form a single void in the core.

As another method, one set forth in Japanese Patent Laid-Open No. 2002-241448 can be mentioned. According to the method, a particulate polymer (A) is prepared by emulsion polymerization of monomers (a) comprising an unsaturated carboxylic acid and a radical polymerizable monomer that can be copolymerized with the carboxylic acid; a particulate polymer (B) is prepared by emulsion-polymerizing 1000 parts by weight of monomers (b) comprising an unsaturated carboxylic acid and a radical polymerizable monomer under the presence of 5 to 1000 parts by weight of the thus prepared particulate polymer (A); adjusting the pH of the dispersion of the particulate polymer (B) at 7 or higher with a volatile base to swell the particulate polymer (B) by neutralization; and thereafter the unreacted portion of the monomer (b) is subjected to polymerization to realize a hollow structure.

On the kind of hollow particles, no special limitation is imparted and commercially available ones or synthetic products can be preferably used. The size of the hollow particles is preferably in the range of from 1 to 5 nm, and preferably from 1 to 2 nm.

The amount of the porous compounds (B-1) and (B-2) to be used for forming the porous insulating film may be generally from 5 to 75% by mass of the resin (A) having a structure of formula (I) of the invention within the range, the additional compound may effectively lower the dielectric constant of the film, not lowering the mechanical strength thereof.

Thus formed, the porous insulating film preferably has a porosity of from 10% to 90%, more preferably from 20% to 80%.

On the other hand, in the fourth aspect of the invention, a part of the polyarylene ether having a specific structure of formula (I') is decomposed through exposure to heat, UV rays or electronic beams, and the film is thereby made to be porous. Specifically, at least one of $Y_1$, $Y_2$, $Ar_1$ and $Ar_2$ of the resin satisfies at least one of the following conditions (a) to (c):

(a) having a structure.-that decomposes under heat at 250° C. to 450° C. to generate gas, (b) having a structure that decomposes through UV irradiation to generate gas, (c) having a structure that decomposes through electron beam irradiation to generate gas.

The structure to satisfy the condition (a) that decomposes under heat at 250° C. to 450° C. to generate gas may be attained by incorporating the structure of the component of (B-1) mentioned above into the resin. Specifically, it includes, for example, (a') polyalkylene oxide structure, (b')

sugar chain structure, (c') vinyl amide polymer structure, (d') (meth)acrylate polymer structure, (e') aromatic vinyl polymer structure.

Preferred are (a'), (b') and (d'); and more preferred is (a'). Specifically, the polyalkylene oxide structure includes, for example, polyethylene oxide structure, polypropylene oxide structure, polytetramethylene oxide structure, polybutylene oxide structure. Concretely, it includes ether structures such as polyoxyethylene alkyl ether structure, polyoxyethylene alkyl phenyl ether structure, polyoxyethylene sterol ether structure, polyoxyethylene lanolin derivative structure, ethylene oxide derivative structure of alkylphenol-formalin condensate, polyoxyethylene-polyoxypropylene block copolymer structure, polyokyethylene-polyoxypropylene alkyl ether structure; ether-ester structures such as polyoxyethylene glycerin fatty acid esters, polyoxye-thylene sorbitan fatty acid esters, polyoxyethylene sorbitol fatty acid esters, polyoxyethylene fatty acid alkanolamide sulfates; other ether-ester structures such as polyethylene glycol fatty acid esters, ethylene glycol fatty acid esters, fatty acid monoglycerides, polyglycerin fatty acid esters, sorbitan fatty acid esters, propylene glycol fatty acid esters, sucrose fatty acid esters.

The structure to satisfy the condition (b) that decomposes through UV irradiation to generate gas means that the compound having the structure decomposes through UV irradiation to give a decomposed product that contains a compound having a boiling point or a decomposition point falling between room temperature and 450° C. It includes, for example, optical acid generator structure, optical base generator structure, optical radical generator structure, combination of optical acid generator and acid-decomposing group-containing structure, and structure that enables optical elimination reaction. Examples of the optical acid generator structure are iodonium salts such as diphenyliodonium sulfonate; sulfonium salts such as triphenylsulfonium triflate; benzyl esters such as o-nitrobenzyl sulfonate, o-nitrobenzyl acetate; phenyl sulfonates such as 1,2,3-tris(sulfonyloxy)benzene; N-imidosulfonates such as N-phthalimido-tosylate, succinimido-sulfonate; diazosulfones such as dicyclohexyldiazodisulfone; diazo compounds such as naphthoquinonediazide; halomethyl compounds such as bis-trichloromethylphenyltriazine; disulfones such as diphenyl disulfone. In addition, further mentioned are ketosulfone compounds, oxime sulfonates, and α-ketosulfonates. Examples of the optical base generator structure are nitrobenzylcarbamates, and cobalt/amine complexes. Examples of the optical radical generator structure are the above-mentioned onium salts and halomethyl compounds, as well as peroxides, biimidazoles, aryl borates, titanocenes. Examples of the acid-decomposing group-containing structure are t-butyl esters, t-butoxycarbonyl esters, as well as acetals, and polyethylene glycols. Optical elimination reaction structures are preferred, such as optical decarboxylation structure or some type of optical denitrogenation structure, since they leave no polar group after gas generation. For the optical decarboxylation structure, preferred is acetic acid structure with any of O, S and N substituted therein, such as phenoxyacetic acids, phenylthioacetic acids, and N-phenylglycines, since it undergoes optical decarboxylation β-ketoacetic acids and nitrophenylacetic acids also undergo decarboxylation. Aryldiazosulfonates undergo denitrogenation and are employable herein.

The structure to satisfy the condition (c) that decomposes through electron beam irradiation to generate gas means that the compound having the structure decomposes through electron beam irradiation to give a decomposed product that contains a compound having a boiling point or a decomposition point falling between room temperature and 450° C. It includes, for example, the same structures as those of the above-mentioned (b), and sulfonyl group-containing structures such as alkyl sulfones and aryl sulfones. Alkyl sulfone structures are preferred as they efficiently generate gas.

In the third aspect of the invention, the other $Y_1$, $Y_2$, $Ar_1$ and $Ar_2$ than those that satisfy any of the above-mentioned conditions (a) to (c) are not specifically defined. For these, preferred are $Y_1$, $Y_2$, $Ar_1$ and $Ar_2$ that satisfy the condition described in the first to third aspects.

For the preferred embodiments of the preparation of the resin, the molar percentage of the components of the resin, the molecular weight of the resin, the additional resin that may be combined with the resin, other additives, the preparation of the material (composition), the coating method and the heat treatment in the fourth aspect of the invention, referred to are those mentioned hereinabove in the section of the first to third aspects. When the heat treatment is combined with UV irradiation or electron beam irradiation, its preferred embodiments are mentioned below.

The wavelength of UV to be used is not specifically defined, but preferably falls between 150 nm and 450 nm. The absorption wavelength may be suitably varied and determined depending on the structure of $Y_1$, $Y_2$, $Ar_1$ and $Ar_2$.

The accelerating voltage of the electron beams to be used is not specifically defined, but preferably falls between 1 and 100 kV, more preferably between 2 and 60 kV.

Thus formed, the insulating-film forming material is excellent in point of the insulating properties, the film uniformity, the dielectric characteristics, the film cracking resistance and the film surface hardness, and is therefore useful in many applications, for example, for interlayer insulating films for semiconductor devices such as LSI, system LSI, DRAM, SDRAM, RDRAM, D-DRAM, protective films such as surface coating films for semiconductor devices, interlayer insulating films for multi-layer wiring substrates, protective films and insulating-protective films for liquid-crystal display devices.

EXAMPLES

The invention is described more concretely with reference to the following Examples. In these, parts and % are all by mass, unless otherwise specifically indicated. The insulating-film forming material was analyzed and evaluated according to the methods mentioned below.

[Weight-average Molecular Weight (Mw)]
Measured through gel permeation chromatography (GPC) under the condition mentioned below.
<Sample> 0.01 g of a sample was dissolved in 2 cc of solvent, and filtered.
<Standard polystyrene> Tosoh's standard polystyrene, TSK Standard.
<Apparatus> Tosoh's high-performance gel permeation chrromatogram (HLC-8220 GPC).
<Column> Tosoh's TSK-gel (GMX).
<Test temperature> 40° C., at flow rate of 1 cc/min.

[In-plane Uniformity]
A sample of insulating-film forming material was applied onto a 6-inch silicon wafer with a spin coater at 1500 to 2500 rpm for 20 seconds. Next, the silicon wafer thus coated with the insulating-film forming material was heated by the use of a hot plate kept at 80° C., for 5 minutes to remove the organic solvent. Next, this was further heated by the use of a hot plate kept at 200° C., for 5 minutes to thereby form a coating film on the silicon wafer. Thus formed, the film was analyzed with an optical film thickness meter (Dainippon Screen's Lambda Ace) on 50 in-plane points of the film. 3σ of the film thickness was obtained from the data, and the film was evaluated for the in-plane uniformity thereof, according to the following criteria.

Good: The 3σ value of the film does not exceed 3% of the average film thickness.

Bad: The 3σ value of the film is 3% or more of the average film thickness.

[Cracking Resistance]

A sample of insulating-film forming material was applied onto a 6-inch silicon wafer with a spin coater, and dried on a hot plate at 80° C. for 5 minutes and then at 200° C. for 5 minutes. Further, this was baked in a nitrogen atmosphere oven at 450° C. for 60 minutes. The outward appearance of the coating film formed on the substrate was observed with a pocket microloupe (×50) (by Peak), and evaluated according to the following criteria. In addition, the sample was subjected to PCT (JDECJESD22-A102-B, 121° C., 100% RH, 15 psig) for 96 hours, and evaluated in the same manner.

Good: No crack found in the surface of the film.
Not good: Cracks found in the surface of the film.

[Dielectric Constant]

A sample of insulating-film forming material was applied onto a 6-inch silicon wafer with a spin coater, and dried on a hot plate at 80° C. for 5 minutes and then at 200° C. for 5 minutes. Further, this was baked in a nitrogen atmosphere oven at 450° C. for 60 minutes. Aluminium was deposited on the thus-coated substrate to form a sample for measurement of dielectric constant. The dielectric constant was calculated from the capacity at 1 MHz by using a mercury probe manufactured by Four Dimensions, Inc. and a HP4285A LCR meter manufactured by Yokogawa HP, Inc.

In addition, the sample was subjected to PCT (JDECJESD22-A102-B, 121° C., 100% RH, 15 psig) for 96 hours, and measured and analyzed in the same manner.

Production Example 1

<Production of Resin (I-3)>

A resin (I-3) (Mw 9,000) was produced in the same manner as in Example B1 in U.S. Pat. No. 6,303,733B1, in which, however, the bisphenol compound was changed to the following compound.

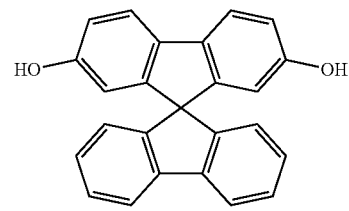

Other resins shown in Table 1 were produced also in the same manner, using bisphenol compounds substituted with the corresponding substituent. Mw of the resins fell between 8,000 and 11,000.

Production Example 2

<Production of Resin (III-1)>

A resin (III-1) (Mw 8,000) was produced in the same manner as in Example B1 in U.S. Pat. No. 6,303,733B1, in which, however, the bisphenol compound was changed to the compound produced in Production Example 1 and the following compound was used for 33 mol % of the bisfluoro compound.

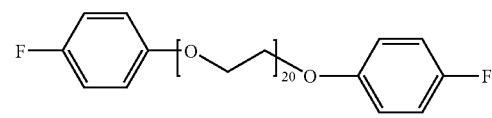

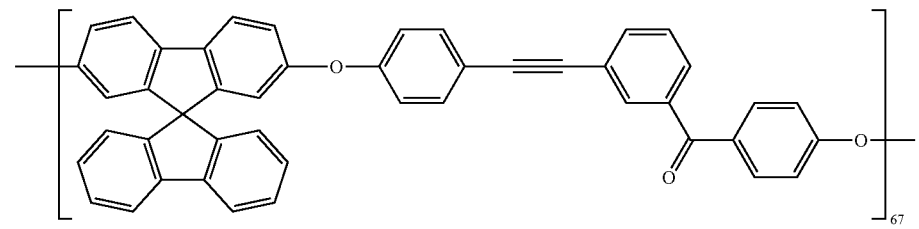

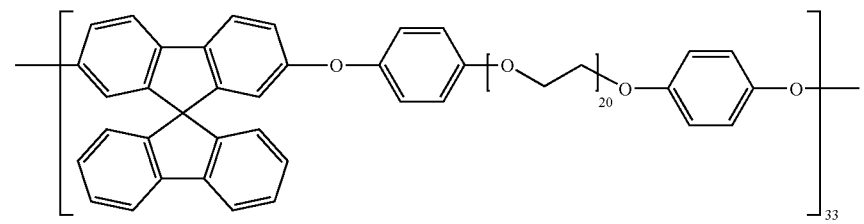

Example 1

5 g of the sample (resin I-1) was dissolved in 45 g of a mixed solvent of diisopropylbenzene/cyclohexanone/propylene glycol monomethyl ether, and the resulting solution was filtered through a 0.2 μm-pore Teflon filter, and applied onto a silicon wafer with a spin coater. The thickness of the film thus formed was 500 nm, and 3σ thereof was 1% of the average film thickness. The film was good. Films of different thickness were formed in the same manner, and the maximum thickness of the film with no crack was about 1,000 nm. This supports good cracking resistance of the film. The dielectric constant of the film was measured, and it was 2.69 and was extremely low.

Examples 2 to 9

Films were formed and evaluated in the same manner as in Example 1, for which, however, the resin compositions shown in Table 1 were used in place of the sample (resin I-1). The result is given in Table 2.

TABLE 1

| Example | Resin | Resin | Other Compound |
|---|---|---|---|
| 1 | I-1 (10 mass %) | | |
| 2 | I-1 (5 mass %) | I-2 (5 mass %) | |
| 3 | I-3 (10 mass %) | | |
| 4 | I-4 (10 mass %) | | |
| 5 | II-1 (10 mass %) | | |
| 6 | II-2 (10 mass %) | | |
| 7 | I-1 (8 mass %) | | diphenylacetylene (2 mass %) |
| 8 | I-1 (4 mass %) | I-2 (5 mass %) | diphenylacetylene (1 mass %) |
| 9 | II-1 (8 mass %) | | diphenylacetylene (2 mass %) |

TABLE 2

| | In-plane Uniformity | Cracking Resistance | Cracking Resistance after PCT | Dielectric Constant | Dielectric Constant after PCT |
|---|---|---|---|---|---|
| Example 1 | good | good | good | 2.69 | 2.69 |
| Example 2 | good | good | good | 2.68 | 2.68 |
| Example 3 | good | good | good | 2.71 | 2.71 |
| Example 4 | good | good | good | 2.67 | 2.67 |
| Example 5 | good | good | good | 2.68 | 2.68 |
| Example 6 | good | good | good | 2.66 | 2.66 |
| Example 7 | good | good | good | 2.67 | 2.67 |
| Example 8 | good | good | good | 2.66 | 2.66 |
| Example 9 | good | good | good | 2.65 | 2.65 |

For comparison, insulating films formed in the same manner as in Example B1 in U.S. Pat. No. 6,303,733B1 and in Example 9 in JP-A 2003-41184 (corresponding to US 2003/0060591 A1) were evaluated in the same manner as that for the insulating film of this Example 1. The comparative films had a dielectric constant of 2.76 and 2.80, respectively.

Example 10

3 g of the resin (I-1) and 3 g of polyethylene oxide block-polypropylene oxide block-polyethylene oxide block copolymer (Newpole PE-61, by Sanyo Chemical, Decomposition point 350° C.) were dissolved in 54 g of a mixed solvent of diisopropylbenzene/cyclohexanone/propylene glycol monomethyl ether, and the resulting solution was filtered through a 0.2 μm-pore Teflon filter, and applied onto a silicon wafer with a spin coater and baked. The thickness of the film thus formed was 510 nm, and 3σ thereof was 2% of the average film thickness. The film was good. Films of different thickness were formed in the same manner, and the maximum thickness of the film with no crack was 1,000 nm. This supports good cracking resistance of the film. The dielectric constant of the film was measured, and it was 2.10 and was extremely low.

Examples 11 to 19

Films were formed and evaluated in the same manner as in Example 10, for which, however, the resin compositions shown in Table 3 were used in place of the resin (I-1). The result is given in Table 4.

TABLE 3

| Example | Resin | Resin | Compound (B-1) | Other Compound |
|---|---|---|---|---|
| 10 | I-1 (5 mass %) | | PE-61 (5 mass %) | |
| 11 | I-1 (2.5 mass %) | I-2 (2.5 mass %) | PE-61 (5 mass %) | |
| 12 | I-3 (5 mass %) | | PE-61 (5 mass %) | |
| 13 | I-4 (5 mass %) | | PE-61 (5 mass %) | |
| 14 | II-1 (5 mass %) | | PE-61 (5 mass %) | |
| 15 | II-2 (5 mass %) | | PE-61 (5 mass %) | |
| 16 | I-1 (4 mass %) | | PE-61 (5 mass %) | diphenylacetylene (1 mass %) |
| 17 | I-1 (2 mass %) | I-2 (2.5 mass %) | PE-61 (5 mass %) | diphenylacetylene (0.5 mass %) |
| 18 | II-1 (4 mass %) | | PE-61 (5 mass %) | diphenylacetylene (1 mass %) |
| 19 | III-1 (10 mass %) | | | |

TABLE 4

| | In-plane Uniformity | Cracking Resistance | Cracking Resistance after PCT | Dielectric Constant | Dielectric Constant after PCT |
|---|---|---|---|---|---|
| Example 10 | good | good | good | 2.10 | 2.10 |
| Example 11 | good | good | good | 2.09 | 2.09 |
| Example 12 | good | good | good | 2.12 | 2.12 |
| Example 13 | good | good | good | 2.08 | 2.08 |
| Example 14 | good | good | good | 2.09 | 2.09 |
| Example 15 | good | good | good | 2.07 | 2.07 |
| Example 16 | good | good | good | 2.08 | 2.08 |
| Example 17 | good | good | good | 2.07 | 2.07 |
| Example 18 | good | good | good | 2.06 | 2.06 |
| Example 19 | good | good | good | 2.10 | 2.10 |

Films were formed and evaluated in the same manner as in Example 10, for which, however, a sample of resin III-1 (9.9 wt %)/triphenylsulfoniumtriflate (0.1 wt %) was used, and, before the second heat treatment, the substrate was divided and exposed to UV rays (100 mJ/cm$^2$, using Ushio Electric's low-pressure mercury lamp UIS-112 and 250 nm-band pass filter). They had a dielectric resistance of 2.17.

Films were formed and evaluated in the same manner as in Example 10, for which, however, a sample of resin III-1 (9.9 wt %)/triphenylsulfoniumtriflate (0.1 wt %) was used, and, before the second heat treatment, the substrate was divided and exposed to electron beams (50 kV, 80 μC/cm$^2$, Ushio Electric's Min-EB). They had a dielectric resistance of 2.14.

For comparison, insulating films formed in the same manner as in Example B1 in U.S. Pat. No. 6,303,733B1 and in Example 9 in JP-A 2003-41184 were evaluated in the same manner as that for the insulating film of this Example 10. The comparative films had a dielectric constant of 2.76 and 2.80, respectively.

A coated film was formed in the same manner as in Example 10 except that cross-linked hollow polymer particles with a particle size of 2 nm were used instead of New Pole PE-61. A result similar to that of Example 10 was obtained.

The invention provides an insulating-film forming material (interlayer insulating-film material) that contains a polyarylene ether having a specific structure and forms a coating film well balanced in point of the thickness uniformity, the cracking resistance and the dielectric characteristics thereof.

The entire disclosure of each and every foreign patent application from which the benefit of foreign priority has been claimed in the present application is incorporated herein by reference, as if fully set forth.

What is claimed is:

1. An insulating-film forming material comprising a resin (A) that has a structure represented by general formula (I):

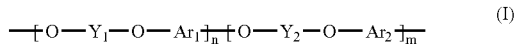

wherein $Y_1$, $Y_2$, $Ar_1$ and $Ar_2$ are the same or different; each of $Y_1$, $Y_2$, $Ar_1$ and $Ar_2$ represents an aromatic ring-containing divalent organic group; at least one of $Y_1$ and $Y_2$ is selected from the group consisting of formulae (Y-1), (Y-2), (Y-3) and (Y-4); m and n each indicates a molar percentage of the repeating units; and m falls between 0 and 100 with (m+n)=100;

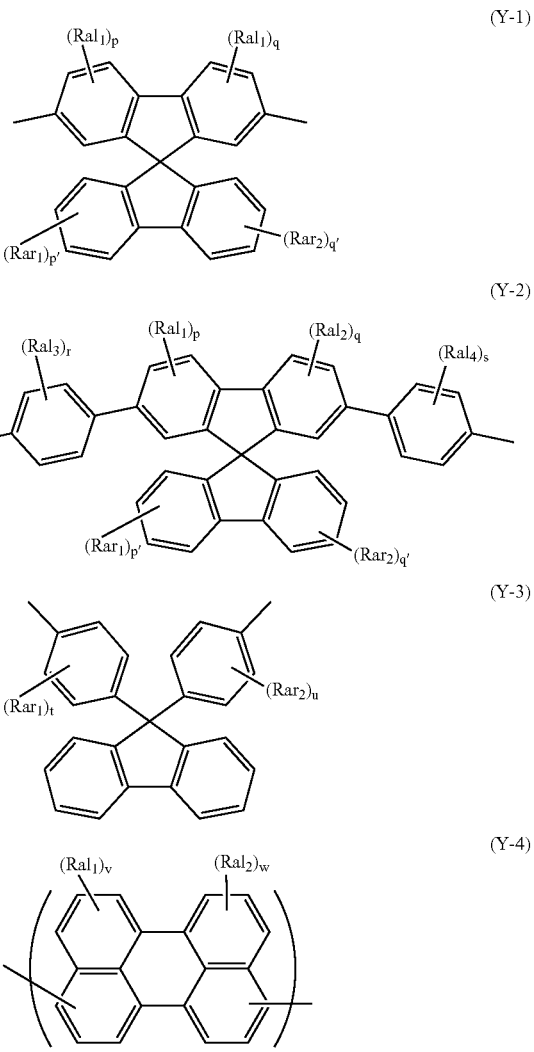

in formulae (Y-1) and (Y-2), $Ral_1$ to $Ral_4$ each represents a monovalent hydrocarbon group not containing an aromatic ring; $Rar_1$ and $Rar_2$ each represents an aromatic ring-containing monovalent hydrocarbon group; $Ral_1$ to $Ral_4$, $Rar_1$ and $Rar_2$ may bond to each other to form a ring; and p, q, r, s, p' and q' each indicates an integer of from 0 to 3; and in formulae (Y-3) and (Y-4), $Ral_1$ and $Ral_2$ each represents a monovalent hydrocarbon group not containing an aromatic ring; $Rar_1$ and $Rar_2$ each represents an aromatic ring-containing monovalent hydrocarbon group; $Ral_1$, $Ral_2$, $Rar_1$ and $Rar_2$ may bond to each other to form a ring; t and u each indicates an integer of from 1 to 4; and v and w each indicates an integer of from 0 to 4.

2. The insulating-film forming material as claimed in claim 1, wherein each of $Y_1$ and $Y_2$ in formula (I) is selected from the group consisting of formulae (Y-1) and (Y-2).

3. The insulating-film forming material as claimed in claim 1, wherein each of $Y_1$ and $Y_2$ in formula (I) is selected from the group consisting of (Y-3) and (Y-4), and each of $Ar_1$ and $Ar_2$ is selected from the group consisting of the following groups:

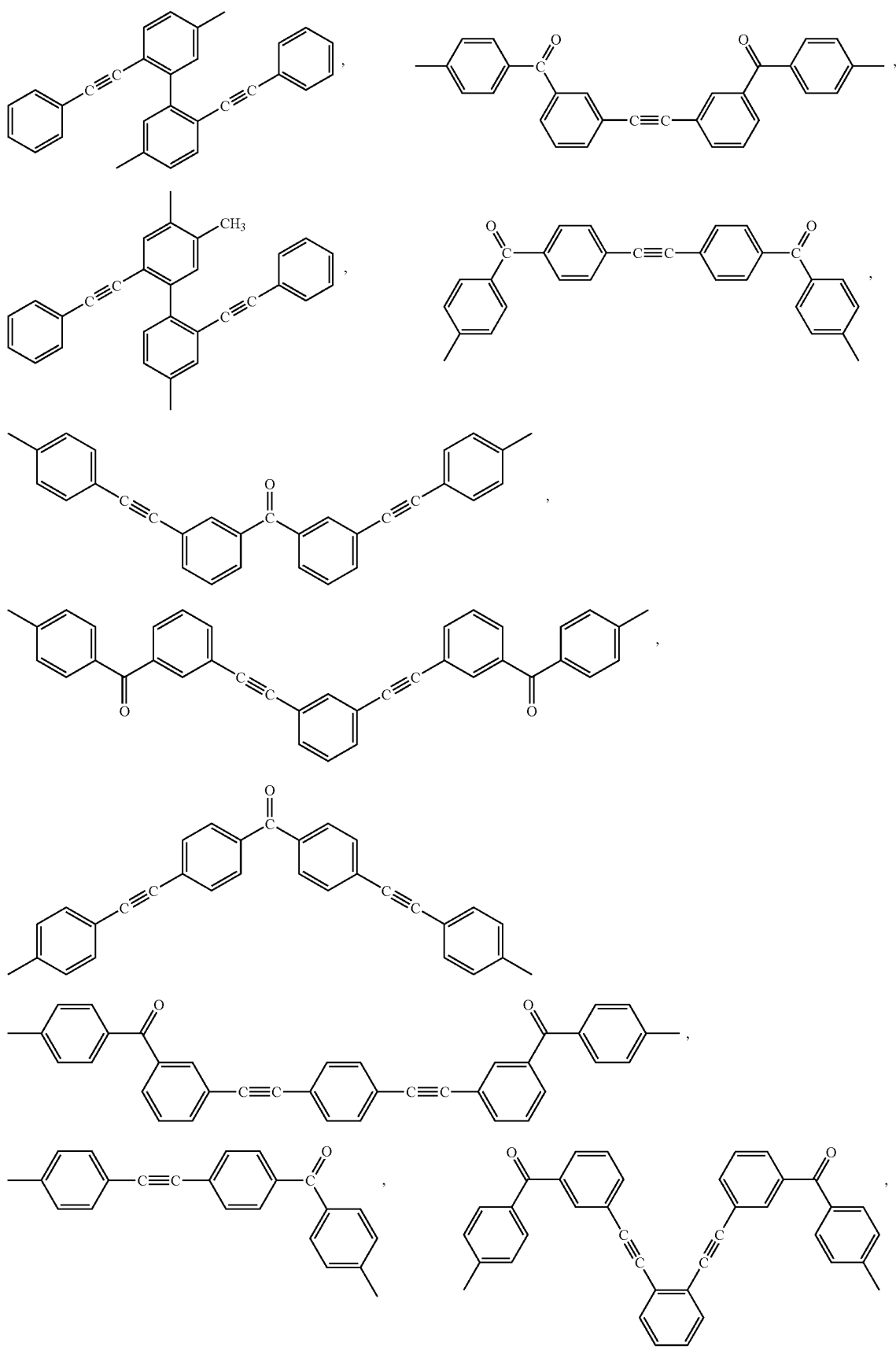

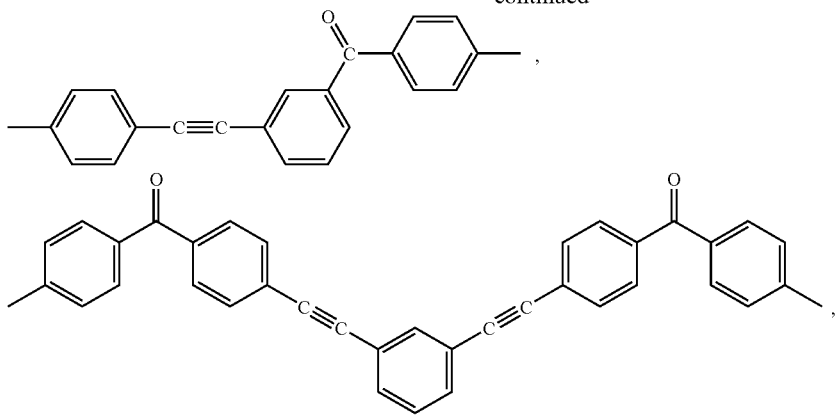

4. An insulating film obtained by using an insulating-film forming material as claimed in claim 1.

5. A porous insulating-film forming material comprising: a polymer that has a structure represented by general formula (I); and at least one of a compound (B-1) and hollow particles (B-2), the compound (B-1) having a boiling or decomposition point of 250° C. to 450° C.,

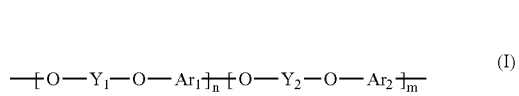

(I)

wherein $Y_1$, $Y_2$, $Ar_1$ and $Ar_2$ are the same or different; each of $Y_1$, $Y_2$, $Ar_1$ and $Ar_2$ represents an aromatic ring-containing divalent organic group; at least one of $Y_1$ and $Y_2$ is selected from the group consisting of formulae (Y-1), (Y-2), (Y-3) and (Y-4); m and n each indicates a molar percentage of the repeating units; and m falls between 0 and 100 with (m+n) =100;

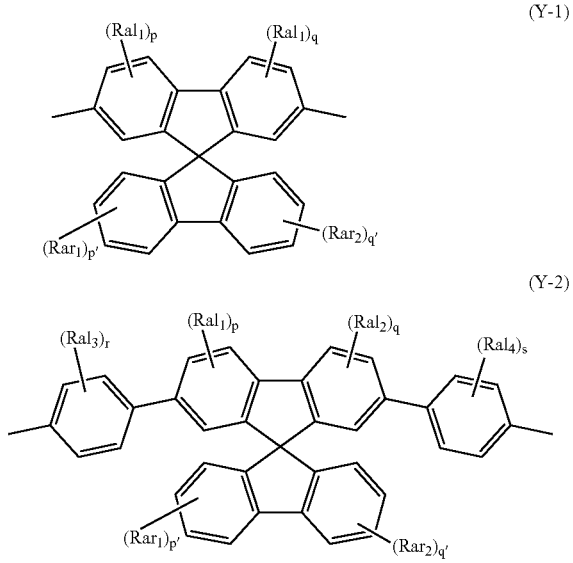

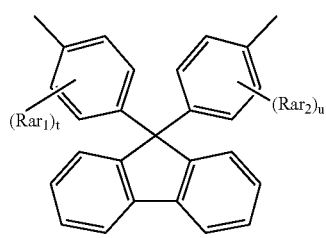

(Y-3)

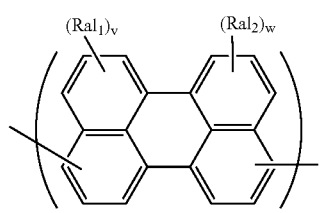

(Y-4)

in formulae (Y-1) and (Y-2), $Ral_1$ to $Ral_4$ each represents a monovalent hydrocarbon group not containing an aromatic ring; $Rar_1$ and $Rar_2$ each represents an aromatic ring-containing monovalent hydrocarbon group; $Ral_1$ to $Ral_4$, $Rar_1$ and $Rar_2$ may bond to each other to form a ring; and p, q, r, s, p' and q' each indicates an integer of from 0 to 3; and in formulae (Y-3) and (Y-4), $Ral_1$ and $Ral_2$ each represents a monovalent hydrocarbon group not containing an aromatic ring; $Rar_1$ and $Rar_2$ each represents an aromatic ring-containing monovalent hydrocarbon group; $Ral_1$, $Ral_2$, $Rar_1$ and $Rar_2$ may bond to each other to form a ring; t and u each indicates an integer of from 1 to 4; and v and w each indicates an integer of from 0 to 4.

6. The porous insulating-film forming material as claimed in claim 5, wherein each of $Y_1$ and $Y_2$ in formulae (I) is selected from the group consisting of formulae (Y-1) and (Y-2).

7. The porous insulating-film forming material as claimed in claim 5, wherein each of $Y_1$ and $Y_2$ in formula (I) is selected from the group consisting of formulae (Y-3) and (Y-4).

8. A porous insulating-film forming material comprising a resin (A') that has a structure represented by formula (I'):

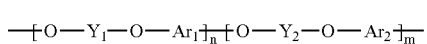 (I')

wherein $Y_1$, $Y_2$, $Ar_1$ and $Ar_2$ are the same or different;
each represents an aromatic ring-containing divalent organic group;
at least one of $Y_1$, $Y_2$, $Ar_1$ and $Ar_2$ includes at least one of (a) a structure that decomposes under heat at 250° C. to 450° C. to generate gas; (b) a structure that decomposes through UV irradiation to generate gas; and (c) a structure that decomposes through electron beam irradiation to generate gas;

m and n each indicates a molar percentage of the repeating units; and m falls between 0 and 100 with (m+n)=100.

9. A porous insulating film obtained by using an insulating-film forming material as claimed in claim 5.

10. A porous insulating film obtained by using an insulating-film forming material as claimed in claim 8.

* * * * *